(12) United States Patent
Weber et al.

(10) Patent No.: US 7,252,054 B2
(45) Date of Patent: Aug. 7, 2007

(54) COMBUSTION ENGINE INCLUDING CAM PHASE-SHIFTING

(75) Inventors: James R. Weber, Lacon, IL (US);
Scott A. Leman, Eureka, IL (US);
Gerald N. Coleman, Corby (GB);
Kevin P. Duffy, Metamora, IL (US);
Eric C. Fluga, Dunlap, IL (US);
Jonathan P. Kilkenny, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/992,074

(22) Filed: Nov. 19, 2004

(65) Prior Publication Data

US 2005/0241613 A1 Nov. 3, 2005

Related U.S. Application Data

(63) Continuation-in-part of application No. 10/933,300, filed on Sep. 3, 2004, which is a continuation-in-part of application No. 10/733,570, filed on Dec. 12, 2003, which is a continuation of application No. 10/143,908, filed on May 14, 2002, now Pat. No. 6,688,280.

(51) Int. Cl.
*F01L 1/34* (2006.01)
*F02B 33/00* (2006.01)

(52) U.S. Cl. .................. 123/90.15; 123/559.1

(58) Field of Classification Search ............ 123/90.15, 123/90.16, 90.17, 90.18, 559.1, 562, 563, 123/299, 305
See application file for complete search history.

(56) References Cited

U.S. PATENT DOCUMENTS

| 883,240 | A | 3/1908 | Sabathe |
|---|---|---|---|
| 982,251 | A | 1/1911 | Coffee |
| 1,033,939 | A | 7/1912 | Robb et al. |
| 1,316,977 | A | 9/1919 | Ricardo |
| 1,562,692 | A | 11/1925 | DeRochefort-Lucay |
| 1,610,888 | A | 12/1926 | Sauer |
| 1,629,327 | A | 5/1927 | Waldo |
| 1,781,147 | A | 11/1930 | Zaikowsky |

(Continued)

FOREIGN PATENT DOCUMENTS

AT 003 134 10/1999

(Continued)

OTHER PUBLICATIONS

Miller, R. and Lieberherr, H., "The Miller Supercharging System for Diesel and Gas Engines Operating Characteristics", International Congress of Combustion Engine Conference, CIMAC, 1957, pp. 787-803.

(Continued)

*Primary Examiner*—Mahmoud Gimie
(74) *Attorney, Agent, or Firm*—Finnegan, Henderson, Farabow, Garrett & Dunner

(57) ABSTRACT

Engines and methods of controlling an engine may involve one or more cams associated with engine intake and/or exhaust valves. In some examples, shifting the rotational phase of one or more cams advances and/or delays timing of the opening and/or closing of valves. Timing of valve closing/opening and possible use of an air supply system may enable engine operation according to a Miller cycle.

49 Claims, 12 Drawing Sheets

U.S. PATENT DOCUMENTS

| | | | |
|---|---|---|---|
| 1,825,817 A | 10/1931 | Patterson | |
| 1,963,780 A | 6/1934 | DuBois | |
| 2,126,616 A | 8/1938 | Cayabyab | |
| 2,202,227 A | 5/1940 | Noland | |
| 2,292,233 A | 8/1942 | Lysholm | |
| 2,344,993 A | 3/1944 | Lysholm | |
| 2,391,176 A | 12/1945 | Mallory | |
| 2,400,247 A | 5/1946 | Miller et al. | |
| 2,453,377 A | 11/1948 | Lozivit | |
| 2,484,009 A | 10/1949 | Barber | |
| 2,484,109 A | 10/1949 | Meinecke | |
| 2,522,456 A | 9/1950 | Mallory | |
| 2,594,845 A | 4/1952 | Baumann | |
| 2,614,547 A | 10/1952 | Meinecke | |
| 2,633,698 A | 4/1953 | Nettel | |
| 2,644,436 A | 7/1953 | Berlyn | |
| 2,670,595 A | 3/1954 | Miller | |
| 2,739,440 A | 3/1956 | Seifert et al. | |
| 2,768,615 A | 10/1956 | Taylor et al. | |
| 2,773,490 A | 12/1956 | Miller | |
| 2,780,053 A | 2/1957 | Cowland | |
| 2,780,912 A | 2/1957 | Miller | |
| 2,817,322 A | 12/1957 | Miller | |
| 2,832,324 A | 4/1958 | Barber | |
| 2,910,826 A | 11/1959 | Mansfield | |
| 2,991,616 A | 7/1961 | Miller | |
| 3,015,934 A | 1/1962 | Miller | |
| 3,029,594 A | 4/1962 | Miller | |
| 3,113,561 A | 12/1963 | Heintz | |
| 3,144,749 A | 8/1964 | Miller | |
| 3,180,327 A | 4/1965 | Neir | |
| 3,186,388 A | 6/1965 | Bricout | |
| 3,232,042 A | 2/1966 | Sarra | |
| 3,250,068 A | 5/1966 | Vullilamy | |
| 3,257,797 A | 6/1966 | Lieberherr | |
| 3,266,234 A | 8/1966 | Cook | |
| 3,336,911 A | 8/1967 | Steiger | |
| 3,355,877 A | 12/1967 | Chaffiotte | |
| 3,405,692 A | 10/1968 | Paschke | |
| 3,413,965 A * | 12/1968 | Gavasso | 123/90.16 |
| 3,416,502 A | 12/1968 | Weiss | |
| 3,591,958 A | 7/1971 | Nebgen | |
| 3,595,013 A | 7/1971 | Brille et al. | |
| 3,665,905 A | 5/1972 | Brille et al. | |
| 3,774,399 A | 11/1973 | Nohira et al. | |
| 3,795,231 A | 3/1974 | Brille | |
| 3,919,986 A | 11/1975 | Goto | |
| 3,921,403 A | 11/1975 | McInerney et al. | |
| 3,938,483 A | 2/1976 | Firey | |
| 3,963,006 A | 6/1976 | Firey | |
| 3,964,451 A | 6/1976 | Goto | |
| 3,977,195 A | 8/1976 | Treuil | |
| 3,986,351 A | 10/1976 | Woods et al. | |
| 3,995,606 A | 12/1976 | Firey | |
| 4,003,347 A | 1/1977 | Sasaki | |
| 4,009,574 A | 3/1977 | Melchior | |
| 4,009,694 A | 3/1977 | Firey | |
| 4,009,695 A | 3/1977 | Ule | |
| 4,020,809 A | 5/1977 | Kern et al. | |
| 4,022,167 A | 5/1977 | Kristiansen | |
| 4,033,304 A | 7/1977 | Luria | |
| 4,050,435 A | 9/1977 | Fuller, Jr. et al. | |
| 4,058,096 A | 11/1977 | Brown | |
| 4,075,986 A | 2/1978 | Keck | |
| 4,075,990 A | 2/1978 | Ribeton | |
| 4,084,557 A * | 4/1978 | Luria | 123/90.15 |
| 4,084,568 A | 4/1978 | Sato et al. | |
| 4,132,213 A | 1/1979 | Weaver | |
| 4,138,973 A | 2/1979 | Luria | |
| 4,149,493 A | 4/1979 | Franke | |
| 4,153,016 A | 5/1979 | Hausknecht | |
| 4,157,079 A | 6/1979 | Kristiansen | |
| 4,161,166 A | 7/1979 | Roznovsky | |
| 4,169,451 A | 10/1979 | Niggemeyer | |
| 4,174,683 A | 11/1979 | Vivian | |
| 4,180,035 A | 12/1979 | Saiki et al. | |
| 4,192,265 A | 3/1980 | Amano et al. | |
| 4,196,593 A | 4/1980 | Froeliger | |
| 4,206,728 A | 6/1980 | Trenne | |
| 4,215,659 A | 8/1980 | Lowther | |
| 4,231,225 A | 11/1980 | Aya | |
| 4,232,641 A | 11/1980 | Curtil | |
| 4,235,077 A | 11/1980 | Bryant | |
| RE30,565 E | 4/1981 | Kristiansen | |
| 4,261,307 A | 4/1981 | Oldberg | |
| 4,276,865 A | 7/1981 | Hamai | |
| 4,280,451 A | 7/1981 | Moore | |
| 4,282,933 A | 8/1981 | Suganami et al. | |
| 4,299,090 A | 11/1981 | Deutschmann | |
| 4,305,352 A | 12/1981 | Oshima et al. | |
| 4,315,488 A | 2/1982 | Tadokoro et al. | |
| 4,327,676 A | 5/1982 | McIntire et al. | |
| 4,344,289 A | 8/1982 | Curiel et al. | |
| 4,350,013 A | 9/1982 | Yoshiba | |
| 4,364,341 A | 12/1982 | Holtmann | |
| 4,387,672 A | 6/1983 | Crocker | |
| 4,400,945 A | 8/1983 | Deutschmann et al. | |
| 4,421,077 A | 12/1983 | Ruggeri | |
| 4,423,709 A | 1/1984 | Arrieta | |
| 4,424,790 A | 1/1984 | Curtil | |
| 4,426,848 A | 1/1984 | Stachowicz | |
| 4,426,985 A | 1/1984 | Kanesaka | |
| 4,438,737 A | 3/1984 | Burandt | |
| 4,446,821 A | 5/1984 | Cataldo | |
| 4,474,008 A | 10/1984 | Sakurai et al. | |
| 4,490,971 A | 1/1985 | Hedelin | |
| 4,494,506 A | 1/1985 | Hayama et al. | |
| 4,520,774 A | 6/1985 | Sitter | |
| 4,527,534 A | 7/1985 | Sakurai et al. | |
| 4,530,318 A | 7/1985 | Semple | |
| 4,539,946 A | 9/1985 | Hedelin | |
| 4,539,948 A | 9/1985 | Toepel | |
| 4,539,951 A * | 9/1985 | Hara et al. | 123/90.17 |
| 4,550,568 A | 11/1985 | Deutschmann et al. | |
| 4,552,112 A | 11/1985 | Nagao et al. | |
| 4,553,385 A | 11/1985 | Lamont | |
| 4,554,890 A | 11/1985 | Okimoto et al. | |
| 4,561,253 A | 12/1985 | Curtil | |
| 4,563,132 A | 1/1986 | Grimmer | |
| 4,565,167 A | 1/1986 | Bryant | |
| 4,566,422 A | 1/1986 | Tadokoro et al. | |
| 4,570,442 A | 2/1986 | Deutschmann et al. | |
| 4,572,114 A | 2/1986 | Sickler | |
| 4,576,127 A | 3/1986 | Doi et al. | |
| 4,582,029 A | 4/1986 | Masuda et al. | |
| 4,584,974 A * | 4/1986 | Aoyama et al. | 123/90.16 |
| 4,589,380 A | 5/1986 | Coad | |
| 4,592,310 A | 6/1986 | Hitomi et al. | |
| 4,592,319 A | 6/1986 | Meistrick | |
| 4,592,329 A | 6/1986 | Yunick | |
| 4,598,611 A | 7/1986 | Frank | |
| 4,608,951 A | 9/1986 | White | |
| 4,622,167 A | 11/1986 | Heath et al. | |
| 4,633,403 A | 12/1986 | Asmus | |
| 4,633,844 A | 1/1987 | Okimoto | |
| 4,643,049 A | 2/1987 | Nishikawa et al. | |
| 4,651,684 A | 3/1987 | Masuda et al. | |
| 4,667,636 A | 5/1987 | Oishi et al. | |
| 4,700,684 A | 10/1987 | Pischinger et al. | |
| 4,702,218 A | 10/1987 | Yoshioka et al. | |
| 4,714,063 A | 12/1987 | Oda et al. | |
| 4,716,863 A | 1/1988 | Pruzan | |
| 4,722,315 A | 2/1988 | Pickel | |
| 4,730,457 A | 3/1988 | Yamada et al. | |

| | | | | | |
|---|---|---|---|---|---|
| 4,738,110 A | 4/1988 | Tateno | 5,251,595 A | 10/1993 | Wei-Min |
| 4,753,198 A | 6/1988 | Heath | 5,253,622 A | 10/1993 | Bornstein et al. |
| 4,756,285 A | 7/1988 | Pischinger | 5,255,637 A | 10/1993 | Schechter |
| 4,759,188 A | 7/1988 | Schatz | 5,255,641 A | 10/1993 | Schechter |
| 4,770,060 A | 9/1988 | Elrod et al. | 5,255,654 A | 10/1993 | Karlsson |
| 4,771,742 A | 9/1988 | Nelson et al. | 5,271,359 A | 12/1993 | Teramoto et al. |
| 4,777,916 A | 10/1988 | Holmer | 5,279,273 A | 1/1994 | Nakata et al. |
| 4,798,184 A | 1/1989 | Palko | 5,293,741 A | 3/1994 | Kashiyama et al. |
| 4,805,571 A | 2/1989 | Humphrey | 5,309,756 A | 5/1994 | Osawa et al. |
| 4,815,423 A | 3/1989 | Holmér | 5,327,856 A | 7/1994 | Schroeder et al. |
| 4,833,971 A | 5/1989 | Kubik | 5,327,858 A | 7/1994 | Hausknecht |
| 4,836,161 A | 6/1989 | Abthoff et al. | 5,333,456 A | 8/1994 | Bollinger |
| 4,841,936 A | 6/1989 | Takahashi | 5,335,633 A | 8/1994 | Thien |
| 4,852,353 A | 8/1989 | Holmer | 5,341,771 A | 8/1994 | Riley |
| 4,860,704 A | 8/1989 | Slaughter | 5,357,936 A | 10/1994 | Hitomi et al. |
| 4,862,841 A | 9/1989 | Stevenson | 5,363,816 A | 11/1994 | Yorita et al. |
| 4,864,984 A | 9/1989 | Blish | 5,365,895 A | 11/1994 | Riley |
| 4,876,988 A | 10/1989 | Paul et al. | 5,365,896 A | 11/1994 | Hara et al. |
| 4,878,464 A | 11/1989 | Richeson, Jr. et al. | 5,367,990 A | 11/1994 | Schechter |
| 4,885,911 A | 12/1989 | Woollenweber et al. | 5,377,631 A | 1/1995 | Schechter |
| 4,903,488 A | 2/1990 | Shibata | 5,379,743 A | 1/1995 | Stokes et al. |
| 4,916,903 A | 4/1990 | Holmer | 5,389,051 A | 2/1995 | Hirate et al. |
| 4,917,058 A | 4/1990 | Nelson et al. | 5,390,492 A | 2/1995 | Levendis |
| 4,928,648 A | 5/1990 | Schatz et al. | 5,392,740 A | 2/1995 | Teramoto et al. |
| 4,930,315 A | 6/1990 | Kanesaka | 5,396,874 A | 3/1995 | Hitomi et al. |
| 4,934,344 A | 6/1990 | Perr | 5,398,502 A | 3/1995 | Watanabe |
| 4,936,263 A | 6/1990 | Tamba et al. | 5,404,844 A | 4/1995 | Schechter |
| 4,945,870 A | 8/1990 | Richeson | 5,408,979 A | 4/1995 | Backlund et al. |
| 4,957,069 A | 9/1990 | Mederer | 5,417,186 A | 5/1995 | Elrod et al. |
| 4,958,606 A | 9/1990 | Hitomi et al. | 5,417,189 A | 5/1995 | Regueiro |
| 4,959,961 A | 10/1990 | Hiereth | 5,419,301 A | 5/1995 | Schechter |
| 4,961,406 A | 10/1990 | Burandt | 5,421,296 A | 6/1995 | Hitomi et al. |
| 4,964,375 A | 10/1990 | Takeyama et al. | 5,421,308 A | 6/1995 | Hitomi et al. |
| 4,982,567 A | 1/1991 | Hashimoto et al. | 5,425,239 A | 6/1995 | Gobert |
| 5,000,145 A | 3/1991 | Quenneville | 5,426,936 A | 6/1995 | Levendis et al. |
| 5,002,022 A | 3/1991 | Perr | 5,427,078 A | 6/1995 | Hitomi et al. |
| 5,005,652 A | 4/1991 | Johnson | 5,429,100 A | 7/1995 | Goto et al. |
| 5,012,778 A | 5/1991 | Pitzi | 5,433,180 A | 7/1995 | Hitomi et al. |
| 5,020,327 A | 6/1991 | Tashima et al. | 5,440,880 A | 8/1995 | Ceynow et al. |
| 5,033,268 A | 7/1991 | Hitomi et al. | 5,443,050 A | 8/1995 | Hitomi et al. |
| 5,036,663 A | 8/1991 | Akagi et al. | 5,445,116 A | 8/1995 | Hara |
| 5,050,378 A | 9/1991 | Clemmens | 5,445,128 A | 8/1995 | Letang et al. |
| 5,054,439 A | 10/1991 | Akagi et al. | 5,452,694 A | 9/1995 | Hara |
| 5,076,248 A | 12/1991 | Schatz | 5,456,222 A | 10/1995 | Schechter |
| 5,083,543 A | 1/1992 | Harada et al. | 5,456,224 A | 10/1995 | Riley |
| 5,090,202 A | 2/1992 | Hitomi et al. | 5,456,225 A | 10/1995 | Oikawa et al. |
| 5,103,645 A | 4/1992 | Haring | 5,465,702 A | 11/1995 | Ferrenberg |
| 5,107,802 A | 4/1992 | Yagi et al. | 5,469,818 A | 11/1995 | Yoshioka et al. |
| 5,117,790 A | 6/1992 | Clarke et al. | 5,479,890 A | 1/1996 | Hu et al. |
| 5,119,795 A | 6/1992 | Goto et al. | 5,488,970 A | 2/1996 | Cippitani |
| 5,121,733 A | 6/1992 | Goto et al. | 5,492,103 A | 2/1996 | Goto |
| 5,123,388 A | 6/1992 | Kanesaka | 5,493,798 A | 2/1996 | Rocke et al. |
| 5,131,229 A | 7/1992 | Kriegler et al. | 5,494,008 A | 2/1996 | Ohkawa et al. |
| 5,131,354 A | 7/1992 | Richeson | 5,494,009 A | 2/1996 | Yamada et al. |
| 5,138,839 A | 8/1992 | Hitomi et al. | 5,495,830 A | 3/1996 | Wu |
| 5,140,953 A | 8/1992 | Fogelberg | 5,497,737 A | 3/1996 | Nakamura |
| 5,140,955 A | 8/1992 | Sono et al. | 5,509,394 A | 4/1996 | Hitomi et al. |
| 5,142,866 A | 9/1992 | Yanagihara et al. | 5,518,818 A | 5/1996 | Kidai et al. |
| 5,161,497 A | 11/1992 | Simko et al. | 5,520,161 A | 5/1996 | Klopp |
| 5,186,139 A | 2/1993 | Matsura | 5,531,193 A | 7/1996 | Nakamura |
| 5,189,998 A | 3/1993 | Hara | 5,535,704 A | 7/1996 | Paul |
| 5,191,867 A | 3/1993 | Glassey | 5,535,716 A | 7/1996 | Sato et al. |
| 5,201,907 A | 4/1993 | Hitomi et al. | 5,546,914 A | 8/1996 | Scheinert |
| 5,203,311 A | 4/1993 | Hitomi et al. | 5,549,080 A | 8/1996 | Uchikawa |
| 5,205,251 A | 4/1993 | Conklin | 5,549,095 A | 8/1996 | Goto et al. |
| 5,205,265 A | 4/1993 | Kashiyama et al. | 5,553,573 A | 9/1996 | Hara et al. |
| 5,215,061 A | 6/1993 | Ogawa et al. | 5,557,983 A | 9/1996 | Hara et al. |
| 5,216,987 A | 6/1993 | Clarke | 5,558,060 A | 9/1996 | Horie et al. |
| 5,230,320 A | 7/1993 | Hitomi et al. | 5,560,207 A | 10/1996 | Ramsden et al. |
| 5,233,831 A | 8/1993 | Hitomi et al. | 5,564,275 A | 10/1996 | Codan et al. |
| 5,233,948 A | 8/1993 | Boggs et al. | 5,564,386 A | 10/1996 | Korte et al. |
| 5,235,940 A | 8/1993 | Nakatani | 5,586,526 A | 12/1996 | Lindquist |
| 5,239,960 A | 8/1993 | Sasaki et al. | 5,586,527 A | 12/1996 | Kreuter |

| | | | | | |
|---|---|---|---|---|---|
| 5,586,531 A | 12/1996 | Vittorio | 6,000,374 A | 12/1999 | Cosma et al. |
| 5,588,411 A | 12/1996 | Kreuter et al. | 6,003,316 A | 12/1999 | Baert et al. |
| 5,590,632 A | 1/1997 | Kato et al. | 6,006,706 A | 12/1999 | Kanzaki |
| 5,606,942 A | 3/1997 | Tsuzuku et al. | 6,012,424 A | 1/2000 | Meistrick |
| 5,607,010 A | 3/1997 | Schonfeld et al. | 6,020,651 A | 2/2000 | Nakamura et al. |
| 5,611,202 A | 3/1997 | Sumser et al. | 6,026,786 A | 2/2000 | Groff et al. |
| 5,611,204 A | 3/1997 | Radovanovic et al. | 6,035,639 A | 3/2000 | Kolmanovsky et al. |
| 5,611,303 A | 3/1997 | Izuo | 6,035,640 A | 3/2000 | Kolmanovsky et al. |
| 5,615,554 A | 4/1997 | Gobert | 6,041,602 A | 3/2000 | Dickey |
| 5,615,646 A | 4/1997 | Feucht | 6,058,348 A | 5/2000 | Ohyama et al. |
| 5,617,726 A | 4/1997 | Sheridan | 6,067,800 A | 5/2000 | Kolmanovsky et al. |
| 5,619,965 A | 4/1997 | Cosma et al. | 6,067,946 A | 5/2000 | Bunker et al. |
| 5,622,053 A | 4/1997 | Freen | 6,076,353 A | 6/2000 | Freudenberg et al. |
| 5,622,144 A | 4/1997 | Nakamura et al. | 6,079,378 A | 6/2000 | Taue et al. |
| 5,623,896 A | 4/1997 | Kato et al. | 6,082,328 A | 7/2000 | Meistrick et al. |
| 5,626,109 A | 5/1997 | Yasumura et al. | 6,085,705 A | 7/2000 | Vorih |
| 5,632,255 A | 5/1997 | Ferrenberg | 6,095,127 A | 8/2000 | Kolmanovsky et al. |
| 5,645,020 A | 7/1997 | Yamada | 6,101,998 A | 8/2000 | Tamura et al. |
| 5,645,030 A | 7/1997 | Letsche | 6,112,523 A | 9/2000 | Kamo |
| 5,649,516 A | 7/1997 | Laveran | 6,128,902 A | 10/2000 | Kolmanovsky et al. |
| 5,657,630 A | 8/1997 | Kjemtrup et al. | 6,135,073 A | 10/2000 | Feucht et al. |
| 5,660,155 A | 8/1997 | Taue et al. | 6,148,778 A | 11/2000 | Sturman |
| 5,661,835 A | 8/1997 | Kato et al. | 6,170,441 B1 | 1/2001 | Haldeman et al. |
| 5,664,528 A | 9/1997 | Kato et al. | 6,178,749 B1 | 1/2001 | Kolmanovsky et al. |
| 5,664,529 A | 9/1997 | Kato et al. | 6,189,504 B1 | 2/2001 | Israel et al. |
| 5,671,600 A | 9/1997 | Pischinger et al. | 6,209,516 B1 | 4/2001 | Yamashita |
| 5,678,515 A | 10/1997 | Kato et al. | 6,223,846 B1 | 5/2001 | Schechter |
| 5,680,841 A | 10/1997 | Hu | 6,234,123 B1 | 5/2001 | Iiyama et al. |
| 5,682,854 A | 11/1997 | Ozawa | 6,234,144 B1 | 5/2001 | Yamaguchi et al. |
| 5,692,464 A | 12/1997 | Kimura | 6,237,551 B1 | 5/2001 | Macor et al. |
| 5,704,316 A | 1/1998 | Fujimoto et al. | 6,244,257 B1 | 6/2001 | Hu |
| 5,711,154 A | 1/1998 | Baechle et al. | 6,260,523 B1 | 7/2001 | Nakamura et al. |
| 5,713,317 A | 2/1998 | Yoshioka | 6,266,957 B1 | 7/2001 | Nozawa et al. |
| 5,713,330 A | 2/1998 | Hitomi et al. | 6,267,107 B1 | 7/2001 | Ward |
| 5,713,331 A | 2/1998 | Eisenbacher et al. | 6,273,076 B1 | 8/2001 | Beck et al. |
| 5,718,199 A | 2/1998 | Hu et al. | 6,276,316 B1 | 8/2001 | Arai et al. |
| 5,724,927 A | 3/1998 | Suzuki | 6,279,550 B1 | 8/2001 | Bryant |
| 5,724,939 A | 3/1998 | Faletti et al. | 6,286,482 B1 | 9/2001 | Flynn et al. |
| 5,732,554 A | 3/1998 | Sasaki et al. | 6,295,816 B1 | 10/2001 | Gallagher et al. |
| 5,732,678 A | 3/1998 | Lindquist et al. | 6,298,300 B1 | 10/2001 | Ohyama et al. |
| 5,762,480 A | 6/1998 | Adahan | 6,301,887 B1 | 10/2001 | Gorel et al. |
| 5,771,868 A | 6/1998 | Khair | 6,301,889 B1 | 10/2001 | Gladden et al. |
| 5,775,099 A | 7/1998 | Ito et al. | 6,302,076 B1 | 10/2001 | Bredy |
| 5,775,283 A | 7/1998 | Sawai et al. | 6,311,493 B1 | 11/2001 | Kurihara et al. |
| 5,778,674 A | 7/1998 | Kimura | 6,332,447 B1 | 12/2001 | Kimura et al. |
| 5,787,859 A | 8/1998 | Meistrick et al. | 6,338,244 B1 | 1/2002 | Guenther et al. |
| 5,791,146 A | 8/1998 | Dungner | 6,338,245 B1 | 1/2002 | Shimoda et al. |
| 5,794,445 A | 8/1998 | Dungner | 6,343,473 B1 | 2/2002 | Kanesaka |
| 5,806,308 A | 9/1998 | Khair et al. | 6,354,254 B1 | 3/2002 | Usko |
| 5,809,964 A | 9/1998 | Meistrick et al. | 6,394,051 B1 | 5/2002 | Filipe et al. |
| 5,813,231 A | 9/1998 | Faletti et al. | 6,405,694 B1 | 6/2002 | Sato |
| 5,816,216 A | 10/1998 | Egashira et al. | 6,439,195 B1 | 8/2002 | Warner |
| 5,819,702 A | 10/1998 | Mendler | 6,460,337 B1 | 10/2002 | Olofsson |
| 5,829,397 A | 11/1998 | Vorih et al. | 6,467,452 B1 | 10/2002 | Duffy et al. |
| 5,839,400 A | 11/1998 | Vattaneo et al. | 6,474,323 B1 | 11/2002 | Beck et al. |
| 5,839,453 A | 11/1998 | Hu | 6,502,551 B2 | 1/2003 | Antonioli et al. |
| 5,845,613 A | 12/1998 | Yoshikawa | 6,513,319 B2 | 2/2003 | Nozawa et al. |
| 5,848,529 A | 12/1998 | Katoh et al. | 6,516,264 B2 | 2/2003 | Ohyama et al. |
| 5,854,988 A | 12/1998 | Davidson et al. | 6,571,765 B2 | 6/2003 | Kuboshima et al. |
| 5,857,437 A | 1/1999 | Yoshioka | 6,575,129 B2 | 6/2003 | Almkvist et al. |
| 5,862,790 A | 1/1999 | Dai et al. | 6,591,795 B2 | 7/2003 | Janak |
| 5,875,743 A | 3/1999 | Dickey | 6,609,315 B1 | 8/2003 | Hendron et al. |
| 5,924,395 A | 7/1999 | Moriya et al. | 6,637,386 B2 * | 10/2003 | Murata et al. ............ 123/90.15 |
| 5,927,075 A | 7/1999 | Khair | 6,640,754 B1 | 11/2003 | Iida |
| 5,937,807 A | 8/1999 | Peters et al. | 6,651,618 B1 | 11/2003 | Coleman et al. |
| 5,950,582 A | 9/1999 | Stein | 6,662,552 B1 | 12/2003 | Gunther et al. |
| 5,957,096 A | 9/1999 | Clarke et al. | 6,679,207 B1 * | 1/2004 | Leman ..................... 123/90.16 |
| 5,960,755 A | 10/1999 | Diggs et al. | 6,688,280 B2 | 2/2004 | Weber et al. |
| 5,967,115 A | 10/1999 | Konopka et al. | 6,722,349 B2 | 4/2004 | Leman et al. |
| 5,970,929 A | 10/1999 | Tacquet | 6,725,647 B2 | 4/2004 | Pfeifer et al. |
| 5,992,361 A | 11/1999 | Murata et al. | 6,732,507 B1 | 5/2004 | Stanglmaier et al. |
| 5,992,390 A | 11/1999 | Moyer | 6,732,685 B2 | 5/2004 | Leman |
| 5,996,560 A | 12/1999 | Schechter | 6,739,125 B1 | 5/2004 | Mulligan |

| | | | |
|---|---|---|---|
| 6,772,742 B2 | 8/2004 | Lei et al. | |
| 6,925,976 B2* | 8/2005 | Israel et al. ............... 123/90.12 | |
| 6,928,807 B2 | 8/2005 | Jacob et al. | |
| 6,951,211 B2 | 10/2005 | Bryant | |
| 6,955,144 B2 | 10/2005 | Sakai et al. | |
| 7,004,122 B2 | 2/2006 | Cornell et al. | |
| 7,007,650 B2* | 3/2006 | Harmon ................... 123/90.44 | |
| 2001/0002379 A1 | 5/2001 | Schechter | |
| 2001/0023671 A1 | 9/2001 | Vorth | |
| 2002/0011233 A1 | 1/2002 | Shiraishi et al. | |
| 2002/0026913 A1 | 3/2002 | Ariga | |
| 2002/0062799 A1* | 5/2002 | Murata et al. ............. 13/90.15 | |
| 2002/0117126 A1 | 8/2002 | Kaneko | |
| 2002/0157623 A1 | 10/2002 | Turner et al. | |
| 2003/0106542 A1 | 6/2003 | Aoyama et al. | |
| 2003/0145810 A1 | 8/2003 | Leman et al. | |
| 2003/0164163 A1 | 9/2003 | Lei et al. | |
| 2004/0020204 A1 | 2/2004 | Callas et al. | |
| 2004/0118118 A1 | 6/2004 | Weber et al. | |
| 2004/0206331 A1 | 10/2004 | Leman | |
| 2004/0237507 A1 | 12/2004 | Duvinage et al. | |
| 2005/0087159 A1* | 4/2005 | Harmon ................... 123/90.16 | |
| 2005/0098162 A1 | 5/2005 | Bryant | |
| 2005/0183692 A1 | 8/2005 | Weber et al. | |

FOREIGN PATENT DOCUMENTS

| | | |
|---|---|---|
| AT | 003 205 | 11/1999 |
| AU | B1-33 707/78 | 4/1982 |
| AU | A-15966/83 | 6/1983 |
| DE | 286050 | 7/1915 |
| DE | 1 001 049 | 1/1957 |
| DE | 1 576 255 | 4/1970 |
| DE | 2 125 368 | 12/1971 |
| DE | 24 57 208 A1 | 6/1976 |
| DE | 28 09 473 | 9/1978 |
| DE | 27 34 715 A1 | 2/1979 |
| DE | 78 03 641 (U1) | 8/1979 |
| DE | 28 14 343 | 10/1979 |
| DE | 29 24 926 | 1/1980 |
| DE | 29 26 327 A1 | 1/1981 |
| DE | 29 30 124 | 2/1981 |
| DE | 29 30 124 A1 | 2/1981 |
| DE | 29 42 326 A1 | 4/1981 |
| DE | 30 06 619 A1 | 8/1981 |
| DE | 30 22 688 | 12/1981 |
| DE | 31 24 668 A1 | 1/1983 |
| DE | 32 28 680 | 2/1984 |
| DE | 34 18 361 | 10/1984 |
| DE | 33 47 567 | 7/1985 |
| DE | 35 26 532 | 2/1986 |
| DE | 34 37 330 | 4/1986 |
| DE | 37 16947 C1 | 3/1988 |
| DE | 37 25 448 | 2/1989 |
| DE | 37 30 001 A1 | 3/1989 |
| DE | 37 37 822 | 5/1989 |
| DE | 37 37 820 (C2) | 8/1989 |
| DE | 37 37 823 | 8/1989 |
| DE | 39 03 474 A1 | 9/1989 |
| DE | 39 08 475 | 9/1989 |
| DE | 38 24 133 | 1/1990 |
| DE | 39 31 379 | 3/1990 |
| DE | 38 35 333 A1 | 4/1990 |
| DE | 40 04 806 | 8/1991 |
| DE | 40 07 516 | 9/1991 |
| DE | 41 15 008 A1 | 11/1992 |
| DE | 42 16 759 | 2/1993 |
| DE | 692 06 718 | 3/1993 |
| DE | 43 08 354 A1 | 9/1993 |
| DE | 43 12 085 | 10/1993 |
| DE | 43 12 205 | 10/1993 |
| DE | 43 32 604 | 3/1994 |
| DE | 195 11 320 | 1/1995 |
| DE | 44 16 670 | 2/1995 |
| DE | 44 39 940 | 5/1996 |
| DE | 44 40 289 A1 | 5/1996 |
| DE | 44 43 169 A1 | 6/1996 |
| DE | 195 15 325 A1 | 10/1996 |
| DE | 195 14500 A1 | 10/1996 |
| DE | 196 10 277 | 10/1996 |
| DE | 195 17 590 | 11/1996 |
| DE | 196 16 555 | 11/1996 |
| DE | 196 48 337 A1 | 6/1998 |
| DE | 19905636 | 3/2000 |
| DE | 100 09 180 | 9/2001 |
| DE | 101 59 801 | 4/2003 |
| EP | 0 095 252 (A2) | 11/1983 |
| EP | 0 275 244 A1 | 7/1988 |
| EP | 0 291 792 (A2) | 11/1988 |
| EP | 0 344 780 (A2) | 12/1989 |
| EP | 0 440 314 (A2) | 8/1991 |
| EP | 0 269 125 B1 | 8/1992 |
| EP | 0 560 476 | 9/1993 |
| EP | 0 568 214 | 11/1993 |
| EP | 0 596 855 | 5/1994 |
| EP | 0 596 860 (A2) | 5/1994 |
| EP | 0 646 703 A2 | 4/1995 |
| EP | 0 718 481 (A2) | 6/1996 |
| EP | 0 761 950 | 3/1997 |
| EP | 0 646 703 B1 | 12/1997 |
| EP | 0 857 866 A1 | 8/1998 |
| EP | 0 560 476 A1 | 10/1999 |
| EP | 0 690 214 B1 | 10/1999 |
| EP | 0 961 018 A1 | 12/1999 |
| EP | 1 022 446 A1 | 7/2000 |
| EP | 1 116 870 A2 | 7/2001 |
| EP | 1 178 192 A2 | 2/2002 |
| EP | 1 234 960 (A2) | 8/2002 |
| FR | 1 066 038 | 6/1954 |
| FR | 1066038 | 6/1954 |
| FR | 2 221 021 | 10/1974 |
| FR | 2 242 884 | 3/1975 |
| FR | 2 269 282 | 11/1975 |
| FR | 2 355 997 | 1/1978 |
| FR | 2 393 937 | 1/1979 |
| FR | 2 417 014 | 9/1979 |
| FR | 2 476 741 | 8/1981 |
| FR | 2 485 622 | 12/1981 |
| FR | 2 583 108 A2 | 12/1986 |
| FR | 2 583 108 (A2) | 12/1986 |
| FR | 2 674 285 A1 | 3/1991 |
| FR | 2 703 107 | 9/1994 |
| FR | 2 757 211 | 6/1998 |
| FR | 2 780 093 (A3) | 12/1999 |
| GB | 1 303 080 | 1/1973 |
| GB | 1 321 452 | 6/1973 |
| GB | 1 331 348 | 9/1973 |
| GB | 1 437 171 | 5/1976 |
| GB | 1 467 969 | 3/1977 |
| GB | 2018352 | 10/1979 |
| GB | 2 072 957 | 10/1981 |
| GB | 2 129 055 | 5/1984 |
| GB | 2 165 587 | 4/1986 |
| GB | 2 180 298 | 3/1987 |
| GB | 2 202 001 | 9/1988 |
| GB | 2 253 881 | 9/1992 |
| GB | 2 301 398 | 4/1996 |
| GB | 2 300 226 | 10/1996 |
| GB | 2 366 328 | 3/2002 |
| GB | 2 366 330 | 3/2002 |
| GB | 2 366 331 | 3/2002 |
| GB | 2 367 147 | 3/2002 |
| GB | 2 367 148 | 3/2002 |
| GB | 2 368 614 | 5/2002 |
| JP | 51-13024 | 2/1976 |
| JP | 55-153820 | 12/1980 |

| | | | | | |
|---|---|---|---|---|---|
| JP | 56-18030 | 2/1981 | JP | 05-71426 | 3/1993 |
| JP | 56-101022 | 8/1981 | JP | 05-71428 | 3/1993 |
| JP | 56-101031 | 8/1981 | JP | 05-86913 | 4/1993 |
| JP | 58-30416 | 2/1983 | JP | 05-86989 | 4/1993 |
| JP | 58-51221 | 3/1983 | JP | 05-099007 | 4/1993 |
| JP | 58-53634 | 3/1983 | JP | 05106415 A2 | 4/1993 |
| JP | 58-53635 | 3/1983 | JP | 05-149118 | 6/1993 |
| JP | 58-57019 | 4/1983 | JP | 05-149136 | 6/1993 |
| JP | 58-59317 | 4/1983 | JP | 05-179966 | 7/1993 |
| JP | 58-62314 | 4/1983 | JP | 05-187279 | 7/1993 |
| JP | 58-65932 | 4/1983 | JP | 05-187329 | 7/1993 |
| JP | 58-117319 | 7/1983 | JP | 05-202810 | 8/1993 |
| JP | 58-119920 | 7/1983 | JP | 05-215002 | 8/1993 |
| JP | 58-122314 | 7/1983 | JP | 05-340290 | 12/1993 |
| JP | 58-122315 | 7/1983 | JP | 06-33775 | 2/1994 |
| JP | 58-122318 | 7/1983 | JP | 06-74038 | 3/1994 |
| JP | 58-131311 | 8/1983 | JP | 06-108860 | 4/1994 |
| JP | 58-133422 | 8/1983 | JP | 06-108861 | 4/1994 |
| JP | 58-133450 | 8/1983 | JP | 06-117280 | 4/1994 |
| JP | 58-180722 | 10/1983 | JP | 6-119933 | 4/1994 |
| JP | 58-187540 | 11/1983 | JP | 6-129271 | 5/1994 |
| JP | 58-211526 | 12/1983 | JP | 06-200763 | 7/1994 |
| JP | 59-7744 | 1/1984 | JP | 06-235305 | 8/1994 |
| JP | 59-60034 | 4/1984 | JP | 06-235307 | 8/1994 |
| JP | 59-99025 | 6/1984 | JP | 06-241097 | 8/1994 |
| JP | 59-119007 | 7/1984 | JP | 06-346711 | 12/1994 |
| JP | 59-158321 | 9/1984 | JP | 63-51121 | 12/1994 |
| JP | 59-188031 | 10/1984 | JP | 07-4287 | 1/1995 |
| JP | 59-211720 | 11/1984 | JP | 07-26994 | 1/1995 |
| JP | 60-19916 | 2/1985 | JP | 07-27022 | 1/1995 |
| JP | 60-90926 | 5/1985 | JP | 07-34883(A) | 2/1995 |
| JP | 60-184918 | 9/1985 | JP | 07-54664 | 2/1995 |
| JP | 61-70130 | 4/1986 | JP | 07-34883(B2) | 4/1995 |
| JP | 61-89132 | 5/1986 | JP | 07-091265 | 4/1995 |
| JP | 61-106918 | 5/1986 | JP | 7-145740 | 6/1995 |
| JP | 61-106919 | 5/1986 | JP | 07-156692 | 6/1995 |
| JP | 61-106920 | 5/1986 | JP | 07-156696 | 6/1995 |
| JP | 61-164036 | 7/1986 | JP | 07-158473 | 6/1995 |
| JP | 61-182421 | 8/1986 | JP | 07-166829 | 6/1995 |
| JP | 62-174513 | 7/1987 | JP | 07-166926 | 6/1995 |
| JP | 62-288333 | 12/1987 | JP | 07-180514 | 7/1995 |
| JP | 63-38620 | 2/1988 | JP | 07-224626 | 8/1995 |
| JP | 63-55324 | 3/1988 | JP | 07-224671 | 8/1995 |
| JP | 63-57822 | 3/1988 | JP | 07-224678 | 8/1995 |
| JP | 63-124828 | 5/1988 | JP | 7-233744 | 9/1995 |
| JP | 63-176616 | 7/1988 | JP | 07-247859 | 9/1995 |
| JP | 363176616 A | 7/1988 | JP | 07-259655 | 10/1995 |
| JP | 63-198728 | 8/1988 | JP | 07-269381 | 10/1995 |
| JP | 63-61717(B2) | 11/1988 | JP | 07-301107 | 11/1995 |
| JP | 63-168221 | 11/1988 | JP | 07-310564 | 11/1995 |
| JP | 63-268926 | 11/1988 | JP | 07-310603 | 11/1995 |
| JP | 63-268927 | 11/1988 | JP | 07-324610 | 12/1995 |
| JP | 63-268942 | 11/1988 | JP | 08-28280 | 1/1996 |
| JP | 363268942 A | 11/1988 | JP | 08-42381 | 2/1996 |
| JP | 10-24414 | 1/1989 | JP | 08-61070 | 3/1996 |
| JP | 64-315 | 1/1989 | JP | 08-82218 | 3/1996 |
| JP | 64-24118 | 1/1989 | JP | 08-100662 | 4/1996 |
| JP | 64-83820 | 3/1989 | JP | 08-158901 | 6/1996 |
| JP | 64-87828 | 3/1989 | JP | 8-158957 | 6/1996 |
| JP | 64-87829 | 3/1989 | JP | 08158957 A | 6/1996 |
| JP | 02-140421 | 5/1990 | JP | 08-170551 | 7/1996 |
| JP | 03-37318 | 2/1991 | JP | 08-177432 | 7/1996 |
| JP | 03-96624 | 4/1991 | JP | 08-177433 | 7/1996 |
| JP | 03-138419 | 6/1991 | JP | 08-177434 | 7/1996 |
| JP | 03-156123 | 7/1991 | JP | 08-177435 | 7/1996 |
| JP | 04-31653 | 2/1992 | JP | -08-177436 | 7/1996 |
| JP | 04031653 A | 2/1992 | JP | 08-291715 | 11/1996 |
| JP | 04-103867 | 4/1992 | JP | 08-326548 | 12/1996 |
| JP | 04-136467 | 5/1992 | JP | 09-151737 | 6/1997 |
| JP | 04-287859 | 10/1992 | JP | 02645942 B2 | 8/1997 |
| JP | 04-129812 | 11/1992 | JP | 10-141068 | 5/1998 |
| JP | 05-1575 | 1/1993 | JP | 10-169513 | 6/1998 |
| JP | 05-5430 | 1/1993 | JP | 10-238354 | 9/1998 |

| | | |
|---|---|---|
| JP | 11-62639 | 3/1999 |
| JP | 11-315726 | 11/1999 |
| JP | 200-120457 | 4/2000 |
| JP | 2000-145484 | 5/2000 |
| JP | 03-96624 (B2) | 8/2000 |
| JP | 2000-220480 | 8/2000 |
| JP | 2001-193468 | 7/2001 |
| JP | 2002-256911 | 9/2002 |
| JP | 2003-262137 | 9/2003 |
| JP | 2003-269202 | 9/2003 |
| SU | 248375 | 12/1969 |
| SU | 914788 | 3/1982 |
| SU | 1195026(A) | 11/1985 |
| SU | 1195027(A) | 11/1985 |
| SU | 1247573 A1 | 7/1986 |
| SU | 1668713(A1) | 8/1991 |
| SU | 1701953(A1) | 12/1991 |
| WO | WO 81/03200 | 11/1981 |
| WO | 83-04280 | 12/1983 |
| WO | WO 90-10141 | 9/1990 |
| WO | WO 90/15917 | 12/1990 |
| WO | WO 91-05152 | 4/1991 |
| WO | WO 92-04536 | 3/1992 |
| WO | WO 92/13178 | 8/1992 |
| WO | WO 94-28288(A2) | 12/1994 |
| WO | WO 94-28288(A3) | 12/1994 |
| WO | WO 95/08705 | 3/1995 |
| WO | WO 95-15429 | 6/1995 |
| WO | WO 95-16106 | 6/1995 |
| WO | WO 95/18294 | 7/1995 |
| WO | WO 95-23280 | 8/1995 |
| WO | WO 95-24549 | 9/1995 |
| WO | WO 95/33131 | 12/1995 |
| WO | WO 96/01939 | 1/1996 |
| WO | WO 96/15362 | 5/1996 |
| WO | WO 96-30635 | 10/1996 |
| WO | WO 97-11260 | 3/1997 |
| WO | WO 98/02653 | 1/1998 |
| WO | WO 98-07973 | 2/1998 |
| WO | WO 98-34014 | 8/1998 |
| WO | WO 98-55744 | 12/1998 |
| WO | WO 99-42718 | 8/1999 |
| WO | WO 99/42718 | 8/1999 |
| WO | WO 00-23698 | 4/2000 |
| WO | WO 00-28197 | 5/2000 |
| WO | WO 00-68565(A1) | 11/2000 |
| WO | WO 01/20150 | 3/2001 |
| WO | WO 01/46574 A2 | 6/2001 |
| WO | WO 01-69062(A1) | 9/2001 |
| WO | WO 01/86125 A1 | 11/2001 |
| WO | WO 2004/081356 | 9/2004 |

OTHER PUBLICATIONS

Miller, R., "Supercharging and Internal Cooling Cycle for High Output", Oil and Gas Power Division proceedings of the National Conference, 1946, ASME 46-OGP-4, pp. 1-5.
Morel, T. et al., "Application of Several Variable Valve Timing Concepts to an LHR Engine", Journal of Engineering for Gas Turbines and Power, 1987, pp. 402-409, vol. 109, ASME 87-ICE-29.
Assanis, D. and Bolton, B., "Variable Valve Timing Strategies for Optimum Engine Performance and Fuel Economy", Jan. 23-27, 1994, ASME 94-ICE-5, pp. 1-11.
Zappa, G. and Franca, T., "A 4-Stroke High Speed Diesel Engine with Two-Stage of Supercharging and Variable Compression Ratio", 13th International Congress on Combustion Engines, 1979, pp. D19-1-D19-22.
Dresner, T. and Barkan, P., "A Review of Variable Valve Timing Benefits and Modes of Operation", SAE Technical Paper Series 891676, 1989, pp. 1-9.
Ahmad, T. and Theobald, M., "A Survey of Variable -Valve-Actuation Technology", SAE Technical Paper Series 891664, Aug. 7-10, 1989, pp. 1-27.
Ma, T., "Effect of Variable Engine Valve Timing on Fuel Economy", SAE Technical Paper Series 880390, Feb. 29-Mar. 4, 1988, pp. 1-8.
Ma, T. and Rajabu, H., "Computer Simulation of an Otto-Atkinson Cycle Engine with Variable Timing Multi-Intake Valves and Variable Compression Ratio", IMechE C53/88, 1988, pp. 273-277.
Porter, B. et al., "Control Technology for Future Low Emissions Diesel Passenger Cars", Ct17/035/96, 12 pages.
Charlton, S. et al., "Application of Variable Valve Timing To a Highly Turbo Charged Diesel Engine", C405/044, IMechE, 1990, pp. 189-195.
Ladommatos, N. and Stone, C., "Developments for Direct Injection Diesel Engines", Mechanical Engineering Publications Limited, 1986, pp. 41-53.
Roe, G., "Variable Valve-Timing Unit Suitable for Internal Combustion Engines", vol. 186 23/72, pp. 301-306 and D103-D105.
Payri, F. et al., "Reduction of Pumping Losses By the Use of a Variable Valve Timing System", IMechE 105/84, 1984, pp. 295-300.
Charlton, S., "A Continuously Variable Poppet Valve Actuator for Internal Combustion Engines", IMechE 82/86, 1986, pp. 157-195.
Thring, R., "The Flexible Diesel Engine", SAE Technical Paper Series 900175, Feb. 26-Mar. 2, 1990, pp. 31-39.
Mavinahally, N. et al., "Insulated Miller Cycle Diesel Engine", SAE Technical Paper Series 961050, Feb. 26-29, 1996, pp. 1-9.
Schechter, M. and Levin, M., "Camless Engine", SAE Technical Paper Series 960581, Feb. 25-29, 1996, pp. 17-31.
Miller, R., "Supercharging and Internal Cooling Cycle for High Output", ASME, 1947, pp. 453-464, vol. 69.
Mardell, J. and Cross, R., "An Integrated, Full Authority, Electrohydraulic Engine Valve and Diesel Fuel Injection System", SAE Technical Paper Series 880602, Feb. 29-Mar. 4, 1988, pp. 1-10.
Gray, C., "A Review of Variable Engine Valve Timing", SAE Technical Series 880386, Feb. 29-Mar. 4, 1988, pp. 1-11.
Asmus, T., "Perspectives on Applications of Variable Valve Timing", SAE Technical Series 910445, Feb. 25-Mar. 1, 1991, pp. 1-13.
Vormstein, W. and Pleimling, H., "Valve Timing and its Effect on the Performance of Medium-Speed Diesel Engines", 12th International Congress on Combustion Engines, 1977, pp. 1-41.
Chute, R., "Pressure Compounding a Four Cycle Diesel Engine", SAE Technical Paper Series 851520, Sep. 9-12, 1985, pp. 1-15.
Ishizuki, et al., "A New Type of Miller Supercharging System for High Speed Engines Part 2-Realization of High BMEP Diesel Engines", SAE Technical Series 851523, Sep. 9-12, 1985, pp. 1-10.
Leonard, H. et al., "Parametric Investigation of Variable Valve Timing Applied to a Turbocharged Diesel Engine", SAE Technical Paper Series 910453, Feb. 25-Mar. 1, 1991, pp. 1-9.
Leonard, H. et al., "Design and Analysis of a Roller Follower Variable Valve Timing System", SAE Technical Paper Series 930824, Mar. 1-15, 1993, pp. 61-70.
Tuttle, J., "Controlling Engine Load by Means of Late Intake-Valve Closing", SAE Technical Paper Series 800794, Jun. 9-13, 1980, pp. 1-13.
Bata, R. et al., "Variable Valve Timing for Diesel Compression Ratio Control", American Society of Mechanical Engineers, Internal Combustion Engine Division ICE, vol. 13, New Technology in Large Bore Engines, 1990, pp. 89-93.
Meier, E. and Baden, "The Miller System-a Possible Solution to Present Problems with Highly Charged Four-Stroke Engines", Brown Boveri Review, Apr. 1977, pp. 235-242, vol. 64, No. 4.
Bolton, B . and Assanis, D., "Optimum Breathing Strategies for Turbocharged Diesel Engines Based on the Miller Cycle Concept", American Society of Mechanical Engineers, Petroleum Division, Engineering Systems Design and Analysis, ASME, 1994, pp. 253-262, vol. 8: Part B.
"Internal-Combustion Engines," The New Encyclopaedia Britannica, 1987, pp. 474-485, Fifteenth edition, Chicago, IL.
Drei, V., "B230 Engines: Research and Experiments for Widening the Speed and Output Range and for Utilizing Alternative Fuels", Tech Paper 41336, 1983, pp. 703-728.

"Camlobe Phasing May Be the Key to Controlling Emissions", Automotive Engineer, Jun./Jul. 1990, pp. 26-27.

Berchtold, M., "Two Stage Supercharging with Comprex", 14th International Congress on Combustion Engines, 1981, pp. D111-1-D111-15.

Frankle, G., "Potential for Reducing Internal Engine Emissions in Modem Commercial Vehicle Diesel Engines", ACEA, Jul. 1-2, 1996, 28 pages.

Sakai, H. et al., "A New Type of Miller Cycle Diesel Engine", JSAE Review, Apr. 1988, pp. 4-9.

Choshi, M. et al., "Development of V6 Miller Cycle Engine", JSAE Review 15 9434154, 1994, pp. 195-200.

Nagao, F. et al., "Relation between Inlet Valve Closing Angle and Volumetric Efficiency of a Four-Stroke Engine", Bulletin of JSME 621.43.05, 1969, pp. 894-901.

Ma, T., "Recent Advances in Variable Valve Timing", pp. 235-252.

Hara, S. et al., "Effects of Intake-Valve Closing Timing on Spark-Ignition Engine Combustion", SAE Technical Paper Series 850074, Feb. 25-Mar. 1, 1985, pp. 1-10.

Stone, R. and Kwan, E., "Variable Valve Actuation Mechanisms and the Potential for their Application", SAE Technical Paper Series 890673, Feb. 27-Mar. 3, 1989, pp. 1-18.

Mecham, G., "Variable Cam Timing as an Emission Control Tool", ASE 600673, Aug. 24-27, 1970, pp. 1-16.

Siewert, R., "How Individual Valve Timing Events Affect Exhaust Emissions", ASE 710609, Jun. 7-11, 1971, pp. 1-17.

Freeman, M. and Nicholson, R., "Valve Timing for Control of Oxides of Nitrogen (NO)", ASE 720121, Jan. 10-14, 1972, pp. 1-10.

Schiele, C., "Design and Development of a Variable Valve Timing (VVT) Camshaft", ASE 740102, Feb. 25-Mar. 1, 1974, pp. 1-9.

Bates, B. et al., "Variable Displacement by Engine Valve Control", ASE Technical Paper Series 780145, Feb. 27-Mar. 3, 1978, pp. 1-12.

Siegla, D. and Siewert, R., "The Variable Stroke Engine—Problems and Promises", ASE Technical Paper Series 780-700, Aug. 7-10, 1978, pp. 1-12.

Luria, D. et al., "The Otto-Atkinson Engine—A New Concept in Automotive Economy", SAE Technical Paper Series, 820352, Feb. 22-26, 1982, pp. 1-8.

Tuttle, J., "Controlling Engine Load by Means of Early Intake Valve Closing", SAE Technical Paper Series 820408, Feb. 22-26, 1982, pp. 1-17.

Asmus, T., "Valve Events and Engine Operation", SAE Technical Paper Series 820749, Jun. 7-10, 1982, pp. 1-14.

Herrin, R. and Pozniak D., "A Lost-Motion, Variable-Valve-Timing System for Automotive Piston Engines", SAE Technical Paper Series 840335, Feb. 27-Mar. 2, 1984, pp. 1-15.

Richman, R. and Reynolds, W., "A Computer-Controlled Poppet-Valve Actuation System for Application on Research Engines", SAE Technical Paper Series 840340, Feb. 27-Mar. 2, 1984, pp. 1-9.

Elrod, A., and Nelson, M., "Development of a Variable Valve Timed Engine to Eliminate the Pumping Losses Associated with Throttled Operation", SAE Technical Paper Series 860537, Feb. 24-28, 1986, pp. 1-8.

Nelson, M. and elrod, A., "Continuous-Camlobe Phasing: An Advance Valve-Timing Approach", SAE Technical Paper Series 870612, Feb. 23-27, 1987, pp. 1-10.

Freudenstein, F. et al., "The Synthesis and Analysis of Variable-Valve-Timing Mechanisms for Internal-Combustion Engines", SAE Technical Paper Series 880387, Feb. 29-Mar. 4, 1988, pp. 1-10.

Lenz, H. et al., "Variable Valve Timing-A Possibility to Control Engine Load without Throttle", SAE Technical Paper Series 880388, Feb. 29-Mar. 4, 1988, pp. 1-7.

Sapienza, S. et al., "An Electronically Controlled Cam Phasing System", SAE Technical Paper Series 880391, Feb. 29-Mar. 4, 1988, pp. 1-7.

Griffiths, P. and Mistry, K, "Variable Valve Timing for Fuel Economy Improvement—The Mitchell System", SAE Technical paper Series 880392, Feb. 29-Mar. 4, 1988, pp. 1-9.

Entzminger, W., "Variable Valve Action (VVA) Through Variable Ratio Rocker Arms", SAE Technical paper Series 880730, Feb. 29-Mar. 4, 1988, pp. 1-11.

Dresner, T. and Barkan, P., "A Review and Classification of Variable Valve Timing Mechanisms", SAE Technical Paper Series 890674, Feb. 27-Mar. 3, 1989, pp. 1-14.

Saunders, R. and Abdul-Wahab, E., "Variable Valve Closure Timing for Load Control and the Otto Atkinson Cycle Engine", SAE Technical Paper Series 890677, Feb. 27-Mar. 3, 1989, pp. 1-11.

Lenz, H. et al., "Initial Test Results of an electro-Hydraulic Variable-valve Actuation System on a Firing Engine", SAE Technical Paper Series 890678, Feb. 27-Mar. 3, 1989, pp. 1-8.

Grohn, M., "The New Camshaft Adjustment System by mercedes-Benz—Design and Application in 4-Valve Engines", SAE Technical Paper Series 901727, Feb. 17-20, 1990, pp. 1-6.

Gould, L. et al., "Performance Evaluation of a Camless Engine Using Valve Actuators with Programmable Timing", SAE Technical Paper Series 910450, Feb. 25-Mar. 1, 1991, pp. 1-13.

Nagesh, M. et al., "Experimental Investigation on Extended Expansion Engine (EEE)", SAE Technical Paper Series 920452, Feb. 24-28, 1992, pp. 1-14.

Wilson, N. et al., "Asymmetric Valve Strategies and Their Effect on Combustion", SAE Technical Paper Series 930821, Mar. 1-5, 1993, pp. 29-40.

Hatano, K. et al., "Development of a New Multi-Mode Variable Valve Timing Engine", SAE Technical Paper Series 930878, Mar. 1-5, 1993, pp. 137-143.

Saunders, R. and Rabia, S., "Part Load Efficiency in Gasoline Engines", 1986, pp. 55-62, Mechanical Engineering Publications Limited, Suffolk, UK.

Stone, C. and Kwan, E., "Variable Valve Timing for IC Engines", Automotive Engineer, pp. 54-58.

Dresner, T., "Multi-input CAM-Actuated Mechanisms and their Application to IC Engine Variable Valve Timing", A Dissertation Submitted to the Department of Mechanical Engineering and the Committee of Graduates Studies of Stanfor University, Sep. 1988, No. 8906655, pp. 1-277.

Action closing Prosecution in *Inter Partes* Reexamination for Control No. 95/000,049 dated Sep. 22, 2005; Patent Owner's Response to Action Closing Prosecution, filed Oct. 24, 2005, including Exhibit A: Second Declaration of Dr. John J. Moskwa, and Exhibit B: Second Declaration of Dr. Joel Hiltner, including Exhibit 1: U.S. Appl. No. 5,535,716, Exhibit 2: U.S. Appl. No. 4,084,557, Exhibit 3: Jul. 13, 2004 press release of IPO announcing National Inventor of the year Award from the Intellectual Property Owner's Association, and Exhibit 4: U.S. Appl. No. 2005/0098162 A1, published on May 12, 2005, including Supplemental Declaration of Jack A. Ekchian, PH.D. and Supplemental Declaration of David F. Merrion.

Office Action dated Jul. 28, 2005 for U.S. Appl. No. 10/773,570.

Office Action dated Aug. 22, 2005 for U.S. Appl. No. 10/933,300.

Office Action dated Aug. 22, 2005 for U.S. Appl. No. 11/105,943.

Office Action dated Nov. 25, 2005 for U.S. Appl. No. 10/993,125.

Office Action dated Nov. 23, 2005 for U.S. Appl. No. 10/992,198.

English Language JPO Abstract of JP Publication No. 05106415 A1, Apr. 27, 1993.

English Language JPO Abstract of JP Publication No. 2000145484 A, May 26, 2000.

English Language JPO Abstract of JP Publication No. 2000120457 A, Apr. 25, 2000.

Communication from European Patent Office dated May 18, 2005 from EP Patent Application No. 03006344.0-2311 including Partial Search Report, Lack of Unity Opinion, and Annex to Search Report.

Request for *Ex Parte* Reexamination for U.S. Appl. No. 6,688,280 filed Jan. 18, 2006, including Declaration of Dr. Joel Hiltner with each Exhibit referred to in the Declaration.

Sakai, H. et al., "A Miller System Application for Efficient Diesel Power Units," the American Chemical Society, 1986, pp. 355-360.

Dickey et al., "Nox Control in Heavy-Duty Diesel Engines—What is the Limit?", SAE 980174, International Congress and Exposition, Detroit, Michigan, Feb. 23-26, 1998, (16 pages).

"Jacobs Vehicle Systems, Future Technology: VVA, VVA—Variable Actuation Systems," http://www.jakebrake.com/content.php4?doc_uid=11 , pp. 1-2.

Richard Car's, "Paxman History Pages, Paxman Diesel Engines Since 1934," http://www.neimesfsnet.com.uk/paxman/paxeng34.htm , pp. 1 & 9.

"ALSTOM Engines, Paxman VP185," pp. 1-3, and 6.

Dipl.-Ing. Jörg Ballauf, "The 8$^{th}$ Annual Automobile and Engine Technology Cooloquium in Aachen An Overview," pp. 1-5.

"Stuman Industries, Leading The Mechanical World Into The Digital Age, hydraulic Valve Actuation," htt://www.sturmanindustries.com/main/hydraulicValveActuation.htm , pp. 1-2.

"Eaton Automotive—Engine Products, Variable Valve Actuation Devices," http://www.automotive.eaton.com/product/engine_controls/VVA.html , p. 1.

Lilly, L., "Diesel Engine Reference book," 1984, Chapter 2, p. 3; Chapter 3, pp. 7-8.

Tennison, P., "An Experimental Investigation of the Effects of Common Rail Injection Parameters on Emissions and Performance in a High Speed Direct Injection Small Bore Diesel Engine," pp. 1-2.

Delphi, "Notas de prensa, Delphi Launches World's Most Advanced Common Rail Diesel System With Ford," Aug. 21, 2004, http://www.delphidieselsystems.com/diesel/es/ESDDSNewsItems4321.asp , pp. 1-3.

Isuzu, Press Release, "Isuzu New Direct Injection Diesel lineup," Oct. 19, 1999, http://www.isuzu.co.ip/world/press/1999/p_1019_2.html , pp. 1-2.

Hara et al., "Effects of Intake-Valve Closing Timing on Spark-Ignition Engine Combustion", SAE Technical Paper Series 850074, Feb. 25-Mar. 1, 1985, pp. 1-10.

Communication/European Search Report dated Apr. 21, 2005 from EP Patent Application No. 04029382.1 of Clyde C. Bryant.

http://www.mazda.com/au/corpora/209.html, Oct. 16, 2001, p. 1-6.

Yorihiro Fukuzawa et al., "Development of High Efficiency Miller Cycle Gas Engine", Mitsubishi Heavy Industries, Ltd., Technical Review, vol. 38, No. 3, Oct. 2001, pp. 146-150.

Request for *Inter Partes* Reexamination Transmittal Form for US. Appl. No. 6,688,280, and Attachment to Request for *Inter Partes* Reexamination Transmittal Form, Sep. 17, 2004; Order Granting/Denying Request for *Inter Partes* Reexamination for *Inter Partes* Reexamination for Control No. 95/000,050 dated Dec. 10, 2004; Office Action dated Dec. 10, 2004, In Inter Partes Reexamination for Control No. 95/000,050; Patent Owner's Response To Office Action, filed Jan. 24, 2005, Including Exhibits A and B; Comments of Requester, filed Feb. 23, 2005, including Declaration of Jack A. Ekchian, Ph.D., Including Exhibit A; Exhibit B: Dresner et al., "A Review and Classifaction of Variable Valve Timing Mechanisms", SAE Technical Paper Series, Mar. 1989; and Exhibit C: Dickey et al., "Nox Control in Heavy-Duty Diesel Engines—What is the Limit?" SAE Technical Paper Series, Feb. 1998; and including Declaration of David F. Merrion, Including Exhibit A and Exhibit B: Bresner et al., "A Review and Classification of Variable Valve Timing Mechanisms", SAE Technical Paper Series, Mar. 1989.

Request for *Inter Partes* Reexamination Transmittal Form for U.S. Appl. No. 6,651,618, and Attachment to Request for *Inter Partes* Reexamination Form, Aug. 27, 2004; Order Granting/Denying Request for Inter Partes Reexamination for Control No. 95/000,049 dated Nov. 23, 2004; Office Action in Inter Partes Reexamination for Control No. 95/000,049 dated Nov. 23, 2004; Patent Owner's Response to Office Action, filed Jan. 24, 2005, including Exhibits A and B; Comments of Requester, filed Feb. 23, 2005, Including Declaration of Jack A. Ekchian, Ph.D., including Exhibit A, Exhibit B: Dresner et al., "A Review and Classification of Variable Valve Timing Mechanisms", SAE Technical Paper Series, mar. 1989; and Exhibit C: Dickey et al., "Nox Control in Heavy-Duty Diesel Engines—What is the Limit?" SAE Technical Paper Series, Feb. 1998; and including Declaration of David F. Merrion, including Exhibit A and Exhibit B: Dresner et al., "A Review and Classification of Variable Valve Timing Mechanisms", SAE Technical Paper Series, Mar. 1989.

Office Action dated Jun. 2, 2003, for U.S. Appl. No. 10/370,852; Amendment filed Jul. 10, 2003.

Office Action dated Jun. 2, 2003, for U.S. Appl. No. 10/143,908; Reply to Office filed Sep. 2, 2003.

Obert, "Internal Combustion Engines and Air Pollution," Based on Internal Combustion Engines, Third Edition, 1973, pp. 612-614.

Edwards et al., "The Potential of a Combined Miller Cycle and Internal EGR Engine for Future Heavy Duty Truck Applications," SAE International, International Congress and Exposition, Feb. 23-26, 1998, pp. 1-19.

Challen et al., "Diesel Engine Reference Book, Second Edition," SAE International, 1999, pp. 75, 81, 84, 146, and 263-305.

Co-pending Application no. 10/992,198; Title: Combustion Engine Including Fluidically--Driven Engine Valve Actuator U.S. Filling Date: Nov. 19, 2004.

Co-pending Application no. 10/992,137; Title: Combustion Engine Including Fluidically--Driven Engine Valve Actuator U.S. Filling Date: Nov. 19, 2004.

Office Action dated May 28, 2004, for U.S. Appl. No. 10/733,570; Amendment filed on Nov. 24, 2004.

Co-pending Application no. 10/993,300; Title: Air and Fuel Supply System for Combustion Engine U.S. Filling Date: Sep. 3, 2004.

Co-pending U.S. Appl. No. 10/992,866; Title: Air and Fuel Supply System for Combustion Engine with Particulate Trap U.S. Filing Date: Nov. 19, 2004.

Co-pending U.S. Appl. No. 10/992,857; Title: Air and Fuel Supply for Combustion Engine Operating at Optimum Engine Speed U.S. Filing Date: Nov. 19, 2004.

Co-pending U.S. Appl. No. 10/992,897; Title: Air and Fuel Supply System for Combustion Engine U.S. Filing Date: Nov. 19, 2004.

Co-pending U.S. Appl. No. 10/993,065; Title: Air and Fuel Supply System for Combustion Engine Operating in HCCI Mode U.S. Filing Date: Nov. 19, 2004.

Co-pending U.S. Appl. No. 10/992,070; Title: Combustion Engine Including Exhaust Purification With On-Board Ammonia Production U.S. Filing Date: Nov. 19, 2004.

Co-pending U.S. Appl. No. 10/992,071; Title: Combustion Engine Including Engine Valve Actuation System U.S. Filing Date: Nov. 19, 2004.

Co-pending U.S. Appl. No. 10/992,069; Title: Air and Fuel Supply System for Combustion Engine U.S. Filing Date: Nov. 19, 2004.

Co-pending U.S. Appl. No. 10/992,125; Title: Air and Fuel Supply System for Combustion Engine U.S. Filing Date: Nov. 19, 2004.

Okamoto, Kazuhisa et al., "Development of a High-Performance Gas Engine Operating at a Stoichiometric Condition-Effect of Miller Cycle and EGR", CIMAC Congress 1998, pp. 1345-1360.

Okamoto, Kazuhisa et al., "Effect of EGR on The Late Intake-Valve Closing Miller Cycle for Natural Gas Engines", JSAE 983420 vol. 29, No. 2, Apr. 1998, pp. 17-22.

Roda, Franco, "Variable Valve Timing—A means of Optimizing Turbocharged Four-Stroke Diesel Engines", MTZ "Motortechnische Zeitschrift" (Engine Technology Magazine) 49, 1988, pp. 303-308.

Akiyama, Mamoru et al., "An Elegant Solution for Vehicular Diesel's Emission and Economy—Hybrid EGR System", SAE 960842, pp. 1-5.

Okamoto, Kazuhisa et al., "Development of a Late Intake-Valve Closing (LIVC) Miller Cycle for Stationary Natural Gas Engines—Effect of EGR Utilization", SAE 972948, 1997, pp. 87-99.

Zhang, Fu-Rong et al., "Methods of Increasing the BMEP (Power Output) for Natural Gas Spark Ignition Engines", SAE 981385, May 4-6, 1998, pp. 11-19.

Zhang, Fu-Rong et al., "Improvement of BMEP for Natural Gas Fuled Spark Ignition Engines by using Miller Cycle and EGR", JSAE 9834196 vol. 29, No. 2, Apr. 1998, pp. 11-16.

Nagumo, Shinichi et al., "Study of Fuel Economy Improvement through Control of Intake Valve Closing Timing: Cause of Combustion Deterioration and Improvement", JSAE 9439311, JSAE Review 16 (1995), pp. 13-19.

"Optimierung von Arbeits- und Brennverfahren fur grobere Dieselmotoren mit Common-Rail-Einspritzung", MTZ Motortechnische Zeitschrift 61(2000) 4, pp. 248-257.

Clarke, Damien et al., "The Simulation, Implementation and Analysis of the Miller Cycle Using an Inlet Control Rotary Valve", SAE Technical Paper Series 970336, Feb. 24-27, 1997, pp. 61-70.

Sakai, Hiroshi et al., "A New Type of Miller Supercharging System for High-Speed Engine—Part 1 Fundamental Considerations and Application to Gasoline Engines", SAE 851522, Sep. 9-12, 1985, pp. 1-7.

Narusawa, Kazuyuki, "An EGR Control Method for Heavy-Duty Diesel Engines under Transiant Operations", SAE Technical Paper Series 900444, Feb. 26-Mar. 2, 1990, pp. 1-14.

Gould, Larrie et al., "Electronic Valve Timing: The impact of electronic valve timing on engine 'breathing' produces performance capability radically different from any traditional internal combustion engine", SAE Automotive Engineering vol. 99, No. 4, Apr. 1991, pp. 19-24.

Taylor, Charles Fayette, "The Internal-Combustion Engine in Theory and Practice: vol. 1: Thermodynamics, Fluid, Flow, Performance", Second Edition, Revised, 1985, pp. 8, 362, 392-394, 456-458, 489-491.

Taylor, Charles Fayette, "The internal-Combustion Engine in Theory and Practice: vol. 2: Combustion, Fuels, Materials, Design", Revised Edition, 1985, pp. 7, 29-31, 71-72, 104, 117, 233-234, 367, 402-49, 422.

Wadman, Bruce W., "Tandem Turbocharging Delivers 250 BMEP Rating", Diesel and Gas Turbine Progress, Jul. 1967, vol. 23, No. 7, pp. 50-51.

Wadman, Bruce W., "Norberg Centrifugal Gas Compressor Unit", Diesel and Gas Engine Progress, Apr. 1955, pp. 24-26.

Office Action dated Jul. 11, 2006 for U.S. Appl. No. 10/992,125.

Zappa et al., CIMAC, "A 4-Stroke High Speed Diesel Engine with Two-Stage of Supercharging and Variable Compression Ratio," 13th International Congress on Combustion Engines, Vienna, 1979 (23 pages).

Office Action dated Feb. 17, 2006 in US. Appl. No. 10/733,570 (11 pages).

Amendment dated Jan. 27, 2006 in U.S. Appl. No. 10/733,570 (16 pages).

Obert, "Internal Combustion Engines, 2$^{nd}$ Edition, *Analysis and Practice*" (pp. 142-144, 153 and 154; Fig. 5-12) (1950).

Thring, R., "The Flexible Diesel Engine," SAE Technical Paper Series 900175, Feb. 26-Mar. 2, 1990 (p. 31, col. 1, 1$^{st}$ para.; col. 1, 2$^{nd}$ para., Ins. 1-4; p. 31, col. 2, 2$^{nd}$ para., Ins. 9-11; col. 2, last para., Ins. 1-2; p. 31, col. 2, Table 1; p. 36, col. 1, first full paragraph; col. 2, last paragraph, Ins. 1-2) (pp. 31-39).

Further Translation of JP 07-091265, listed above (pp. 9-10, para. 15; pp. 11-12, para. 20; p. 13, para. 24) (30 pages).

Request for *Ex Parte* Reexamination Transmittal From filed Jan. 20, 2006 (Control No. 90/007,885); Request for *Ex Parte* Reexamination filed Jan. 20, 2006; Claim Chart entitled: Comparison of '280 Patent Claims to Zappa et al.; executed Declaration of Dr. Joel Hiltner; Exhibits A-E; copy of U.S. Appl. No. 6,688,280; From PTO SB/08 listing 3 documents cited in the Request and copies thereof; Order Granting/Denying Request for Ex Parte Reexamination for Control No. 90/007,885.

Ansdale, R.F., "The Varimax Engine", Automobile Engineer, Sep. 1968, pp. 382-387.

Miller, R., "Norberg Supairthermal Diesel Duafuel and Gas Engines Operating on the Miller Supercharging System", Petroleum Division Conference, ASME, Sep. 1951.

Brinson, L., "High Performance Gas Burning Engines", Seventh International Congress on Combustion Engines, CIMAC, Apr. 1965. pp. 603-622.

Azouz, M.R. et al., "Digital Control of Engine Valve Timing", Military Technical College, Egypt, Isata, 1987, pp. 193, 195-205.

D'Yachenko, V.G., "Internal Combustion Engines Operation Theory", Kiev, 1988.

"Valve Timing by Tensioner", Engineering Magazine, May 1986, pp. 343, 359.

Hutten, H., "Schnelle Motoren seziert und frisiert", Motorbuchverlag ISBN 3-87943-974-5, 1994, 2 pages.

Heywood, J., "Internal Combustion Engine Fundamentals", McGraw Hill International Editions, Automotive Technology Series, 1989, pp. 6-10.

Hilliard, J., and Springer, George S., "Fuel Economy in Road Vehicles Powered by Spark Ignition Engines", 1988, pp. 182-187.

"Internal Combustion Engines", Moscow, 1990, pp. 12-23.

Khutziev, A.I., "Internal Combustion Engines with Controlled Compression Mode", Moscow, 1986, pp. 64-69, 102-103.

Lennin, I.M., "Theory of Automotive and Tractor Engines", Moscow, 1969, pp. 34-41, 62-65, 364-367.

Miller, R., "A Low Temperature Supercharging System for Compression, Pilot Oil and Spark Ignition Engines", ASME, paper No. 57-A-250, 1957, pp. 1-10.

"High Powered Medium Speed Engines", The Motor Ship, July 1975, pp. 135-173.

"Two-stage Turbocharging for GMT's B230 high Speed Engine", The Motor Ship, Sep. 1978, pp. 27-32, 67-68.

O'Flynn, G. et al., "Combustion Characteristics of an Otto-Atkinson Engine Using Late Inlet Valve Closing and Multi-Point Electronic Fuel Injection", C389/041 IMechE, Paper No. 925107, 1992, pp. 329-338.

Petrov, A.K. et al., "Structural Design of Foreign Cars Produced at 1983", Annual Review, Part III, Automotive Engines, Moscow, 1983, pp. 3-19.

Rajikov, I. et al., "Automotive and Tractor Engines Structural Design", Moscow, 1986. pp. 18-27, 104-107.

Rannev, A. V., "Internal Combustion Engines for Construction Site and Road-Building Engines", Moscow, 1986, pp. 10-17.

Boggs, D.L. et al., "The Otto-Atkinson Cycle Engine-Fuel Economy and Emissions Results and Hardware Design", SAE Technical Paper Series 950089, Feb. 27-Mar. 2, 1995, pp. 1-13.

Scott, D., "Variable Valve Timing Has Electronic Control", SAE Automotive Engineering, May 1984, pp. 86-87.

Kentfield, J., "Diesel Engines with Extended Expansion Strokes", SAE Technical Paper Series 891866, Sep. 11-14, 1989, pp. 1-10.

Herzog, P. et al., "NOx Reduction Strategies for DI Diesel Engines", SAE Technical Paper Series 920470, Feb. 24-28, 1992, pp. 1-17.

Durnholz, M. et al., "Exhaust-Gas Recirculation—A Measure to Reduce Exhaust Emissions of DI Diesel Engines", SAE Paper Technical Series 920725, Feb. 24-28, 1992.

Stebler, H. et al., "Reduction of NOx Emissions of D.I. Diesel Engines by Application of the Miller-System: An Experimental and Numerical Investigation", SAE Technical Paper Series 960844, Feb. 26-29, 1996, pp. 1-11.

Kamo, R. et al., "Emissions comparisons of an Insulated Turbocharged Multi-Cylinder Miller Cycle Diesel Engine", SAE Technical Paper Series 980888, Feb. 23-26, 1998, pp. 1-7.

Sapojhnikov, E.N., "International combustion Engines", Kiev, 1979, pp. 8-17.

Torazza, G., "A Variable Life and Event Control Device for Piston Engine Valve Operation", pp. 59-68, Italy.

Wallace, W., and Lux, F., "A Variable Compression Ratio Engine Development", SAE Transactions, Paper No. 762A, Oct. 1963, pp. 680-707.

"Volvo D6A250 Supercharge—Med hog Prestanda Redan Fran Start", Volvo, 1996.

Vzorov, B.A., and Mordukhovich, M.M., "Forcing of Tractor Engines", Moscow, 1974, pp. 24-31.

Stojek, D., and Stwiorok, A., "Valve Timing with Variable Overlap Control", XX Fisita Congress, SAE 845026. May 1984, pp. 2.8-2.14.

Nagumo, S., et al., "Study of Fuel Economy Improvement Through Control of Intake Valve Closing Timing", 1994, pp. 169-172.

Zhang, F: et al., "Study on Miller Cycle Gas Engine for Generation—A Verification of Miller Cycle Effect", JSAE Convention, May 1995, vol. 951, No. 5, pp. 277-280, Paper No. 9534621.

Nakajima, Y., et al., "Study of Improving Fuel Economy by Early Intake-Valve-Closing Concept", No. 24, 1982, pp. 19-26.

Sakono, T., et al., "Mazda 2.5/ Inline 4W-T Type Turbo Diesel Engine", Mazda Motor Corporation, Dec. 1995, vol. 34, No. 435, pp. 93-99.

Sasaki, y., "Komatsu Turbo and Turbo Diesel Engine Two Stage Turbocharging for Small Highspeed Diesel Engine", Komatsu Ltd., Dec. 1984, vol. 23 No. 301, pp. 19-24.

Kouichi, H., et al., "Development of Miller Cycle Gasoline Engine—Miller Cycle Engine with Late Intake Valve Closing and Lysholm Compressor", May 1993, Paper No. 9302088, pp. 201-204.

Ichimaru, K., et al., "A High Expansion Ratio Gasoline engine with Intake Control Rotary Valve Installation", Oct. 1992, Paper No. 924008, pp. 29-32.

Koichi, H., et al., "KJ-ZEM Type Miller Cycle DOHC/2254 cc", Serial No. 0005, pp. 118-163.

Suzuki, T., et al., "Application of a Miller System to a Diesel Engine", Nov. 1991, Paper No. 912183, pp. 2.13-2.16.

Zhang, F., et al., "Effect of Miller Cycle on Gas Engine for Generation", JSAE Spring Convention, Jan. 1996, vol. 27, No. 1, Paper No. 9630723, pp. 79-83.

Ichimaru, K., et al., "Computer Simulation of Miller Cycle Gasoline Engines", JSAE Spring Convention, May 1995, vol. 951, No. 5, Paper No. 9534612, pp. 273-276.

Heuser, F., "Von der Fakuitat fur Maschinenwesen der Rheinisch-Westfallschen Technischen Hochschule Aachen genehmigte Dissertation zur Eriangung des akadermischen Grades esines", A Dissertation Submitted to the, Jul. 8, 1988, pp. 1-99.

Haas, A. et al., "Mesures Pour Reduire Les Emissions NOx Des Moteurs Pour Vehicules Utillitaires" Le Moteur Diesel: Evolution Et Mutations, SIA—Societe Des Ingenieurs De L'Automobile, Apr. 10-11, 1996, pp. 1-16.

Montagne, X. et al., "Analyse De La Sensibilite Aux Parametres Gazote D'Un Moteur Diesel D'Automobile A Injection Directe" Le Moteur Diesel: Evolutions Et Mutations, SIA—Societe Des Ingenieurs De L'Automobile, Apr. 10-11, 1996, pp. 1-16.

Herzog, P., "HSDI-Diesel-Euro III Technologies", Le Moteur Diesel: Evolution Et Mutations, SIA—Societe Des Ingenieurs De L'Automobile, Apr. 1996, pp. 1, 4, 8.

Feucht, H. et al., "Development Of The New Turbocharged 2.51 Four Valves Prechamber Diesel Engine For The Mercedes Benz Compact Class", Le Moteur Diesel: Evolution Et Mutations, SIA—Societe Des Ingenieurs De L'Automobile, Apr. 10-11, 1996, 15 pages.

Brun, R., "Science et technique du moteur diesel industriel et de transport", Institut Francais Du Petrole, 1981, 7 pages.

Briand, J., "Diesels marins description et fonctionnement" Masson, Paris, 1992, pp. 137-138.

"Moteurs Diesel", E.T.A.I., 1990, p. 330.

Foy, H., "Technologie Du Turbocompresseur", E.T.A.I., pp. 62, 65, 140.

Suzuki, T., et al. "Development of Diesel Combustion for Commercial Vehicles", Future Diesel Engines, Society of Automotive Engineers, Inc., SAE 972685, 1997, pp. 47-65.

Iwata, N., et al, "Improvement of anit-knocking performance by supercharged Miller-Cycle engine—RAM-Pulsation effects on anti-knocking performance by Miller-Cycle", Mazda Motor Corporation, May 1995, No. 9534603.

Haugen, D., "Performance And Combustion Effects Of Phased Late Intake Valve Closure On A Two Intake Valve Engine", A Thesis Submitted to the Faculty of the Graduate School of the University of Minnesota, Dec. 1995, pp. 1-84.

Boggs, D. et al., "A Small Displacement Dl Diesel Engine Concept for High Fuel Economy Vehicles", Future Diesel Engines, Aug. 6-8, 1997, SAE SP-1287, SAE No. 972680, pp. 1-97.

Kesgin, Ugur, "Efficiency improvement and NOx emission reductionpotantials of two-stage turbocharged Miller cycle for stationary natural gas engines", International Journal of Energy Research, 2005, vol. 29, pp. 189-216.

Communications from European Patent Office dated Apr. 21, 2005 and Feb. 23, 2005 from EP Patent Application Nos. 04029382.1 and 04029382.1-2311 including Partial Search Report, Lack of Unity Opinion, and Annex to Search Report.

Office Action dated Feb. 17, 2006 for U.S. Appl. No. 10/733,570.

Reply to Office Action dated Feb. 22, 2006 for U.S. Appl. No. 10/933,300.

Office Action dated Apr. 7, 2006 for U.S. Appl. No. 10/932,069.

Office Action dated Mar. 16, 2006 for U.S. Appl. No. 10/992,070.

Office Action dated Mar. 15, 2006 for U.S. Appl. No. 10/992,071.

Office Action dated Mar. 17, 2006 for U.S. Appl. No. 10/992,137.

Office Action dated Apr. 20, 2006 for U.S. Appl. No. 10/992,198.

Office Action dated Apr. 12, 2006 for U.S. Appl. No. 10/992,857.

Office Action dated Mar. 29, 2006 for U.S. Appl. No. 10/992,866.

Office Action dated Apr. 18, 2006 for U.S. Appl. No. 10/992,897.

Office Action dated Apr. 18, 2006 for U.S. Appl. No. 10/993,065.

Reply to Office Action dated Feb. 22, 2006 for U.S. Appl. No. 11/105,943.

Office Action dated Feb. 8, 2006 for U.S. Appl. No. 90/007,885.

Reply to Office Action dated May 25, 2006 for U.S. Appl. No. 10/992,125.

Substitute Amendment After Final filed on Nov. 9, 2006 for U.S. Patent Application No. 11/236,765.

Office Action dated Sep. 12, 2006 for U.S. Patent Application No. 11/236,765.

Amendment and Response to May 23, 2006 Office Action filed on Aug. 23, 2006 for U.S. Patent Application No. 10/996,695.

Notice of Allowance and Notice of Allowability dated Sep. 20, 2006 for U.S. Patent Application No. 10/996,695.

\* cited by examiner

COMBUSTION ENGINE INCLUDING CAM PHASE-SHIFTING

RELATED APPLICATIONS

This application is a continuation-in-part of U.S. patent application Ser. No. 10/933,300, filed Sep. 3, 2004, which is a continuation-in-part of U.S. patent application Ser. No. 10/733,570, filed Dec. 12, 2003, which is a continuation of U.S. patent application Ser. No. 10/143,908, filed May 14, 2002, now U.S. Pat. No. 6,688,280. This application is also a continuation-in-part of U.S. patent application Ser. No. 10/733,570, filed Dec. 12, 2003, which is a continuation of U.S. patent application Ser. No. 10/143,908, filed May 14, 2002.

The entire disclosure of each of the U.S. patent applications and the U.S. patent mentioned in the preceeding paragraph is incorporated herein by reference. In addition, the entire disclosure of U.S. Pat. No. 6,679,207 is incorporated herein by reference.

TECHNICAL FIELD

The present invention relates to a combustion engine, an air and fuel supply system, and a variable engine valve actuation system.

BACKGROUND

An internal combustion engine may include one or more turbochargers for compressing a fluid, which is supplied to one or more combustion chambers within corresponding combustion cylinders. Each turbocharger typically includes a turbine driven by exhaust gases of the engine and a compressor driven by the turbine. The compressor receives the fluid to be compressed and supplies the compressed fluid to the combustion chambers. The fluid compressed by the compressor may be in the form of combustion air or an air/fuel mixture.

An internal combustion engine may also include a supercharger arranged in series with a turbocharger compressor of an engine. U.S. Pat. No. 6,273,076 (Beck et al., issued Aug. 14, 2001) discloses a supercharger having a turbine that drives a compressor to increase the pressure of air flowing to a turbocharger compressor of an engine.

While a turbocharger may utilize some energy from the engine exhaust, the series supercharger/turbocharger arrangement does not utilize energy from the turbocharger exhaust. Furthermore, the supercharger requires an additional energy source.

The operation of an internal combustion engine, such as, for example, a diesel, gasoline, or natural gas engine, may cause the generation of undesirable emissions. These emissions, which may include particulates and oxides of nitrogen ($NO_x$), are generated when fuel is combusted in a combustion chamber of the engine. An exhaust stroke of an engine piston forces exhaust gas, which may include these emissions, from the engine. If no emission reduction measures are in place, these undesirable emissions will eventually be exhausted to the environment.

Research is currently being directed towards decreasing the amount of undesirable emissions that are exhausted to the environment during the operation of an engine. Unfortunately, the implementation of emission reduction approaches typically results in a decrease in the overall efficiency of the engine.

Additional efforts are being focused on improving engine efficiency to compensate for the efficiency loss due to the emission reduction systems. One such approach to improving the engine efficiency involves adjusting the actuation timing of the engine valves. For example, the actuation timing of the intake and exhaust valves may be modified to implement a variation on the typical diesel or Otto cycle known as the Miller cycle. In a "late intake" type Miller cycle, the intake valves of the engine are held open during a portion of the compression stroke of the piston. Selective implementation of a variation on the conventional actuation timing, such as the Miller cycle, may lead to an improvement in the overall efficiency of the engine.

The engine valves in an internal combustion engine are typically driven by a cam arrangement that is operatively connected to the crankshaft of the engine. The rotation of the crankshaft results in a corresponding rotation of a cam that drives one or more cam followers. The movement of the cam followers results in the opening and closing of the engine valves. The shape of the cam typically governs the timing and duration of the valve opening/closing. As described in U.S. Pat. No. 6,237,551 to Macor et al., issued on May 29, 2001, a "late intake" Miller cycle may be implemented in such a cam arrangement by modifying the shape of the cam to overlap the actuation of the intake valve with the start of the compression stroke of the piston.

As noted above, the timing of a valve system driven by a cam arrangement is determined by the shape of the driving cam. Because the shape of the cam is fixed, this type of arrangement is sometimes inflexible and often only capable of permitting a varied timing through the use of complex mechanisms.

The present disclosure is directed to possibly addressing one or more drawbacks associated with prior approaches.

SUMMARY

One aspect of the present disclosure may relate to a method of operating an internal combustion engine including at least one cylinder and a piston slidable in the cylinder. The method may include supplying pressurized air from an intake manifold to an air intake port of a combustion chamber in the cylinder, and operating an air intake valve to open the air intake port to allow pressurized air to flow between the combustion chamber and the intake manifold substantially during a majority portion of a compression stroke of the piston. The operating of the air intake valve may include operating the air intake valve via-at least one rotatable cam associated with the air intake valve. The method may also include shifting rotational phase of at least one of the cam and a camshaft including the cam.

Another aspect may relate to an internal combustion engine including an engine block defining at least one cylinder, and a head connected with said engine block, the head including an air intake port, and an exhaust port. A piston may be slidable in the cylinder, and a combustion chamber may be defined by said head, said piston, and said cylinder. An air intake valve may be movable to open and close the air intake port. An air supply system may including at least one turbocharger fluidly connected to the air intake port. A fuel supply system may be operable to inject fuel into the combustion chamber. At least one cam may be rotatable to operate the air intake valve. The engine may also include a phase shifting device configured to shift rotational phase of the cam.

In an additional aspect, there may be a method of operating an internal combustion engine including at least one cylinder and a piston slidable in the cylinder. The method may include imparting rotational movement to a first turbine and a first compressor of a first turbocharger with exhaust air flowing from an exhaust port of the cylinder; imparting rotational movement to a second turbine and a second compressor of a second turbocharger with exhaust air flowing from an exhaust duct of the first turbocharger; compressing air drawn from atmosphere with the second compressor; compressing air received from the second compressor with the first compressor; supplying pressurized air from the first compressor to an air intake port of a combustion chamber in the cylinder via an intake manifold; and operating a fuel supply system to inject fuel directly into the combustion chamber. The method may also include operating an air intake valve to open the air intake port to allow pressurized air to flow between the combustion chamber and the intake manifold, wherein operating the air intake valve includes operating the air intake valve via at least one rotatable cam associated with the air intake valve. The method may also include shifting rotational phase of at least one of the cam and a camshaft including the cam.

A further aspect may relate to a method of controlling an internal combustion engine having a variable compression ratio, said engine including a block defining a cylinder, a piston slidable in said cylinder, and a head connected with said block, said piston, said cylinder, and said head defining a combustion chamber. The method may include pressurizing air; supplying said air to an intake manifold of the engine; and maintaining fluid communication between said combustion chamber and the intake manifold during a portion of an intake stroke and through a portion of a compression stroke, wherein the maintaining may includes operating an air intake valve via at least one rotatable cam associated with the air intake valve. The method may also include shifting rotational phase of at least one of the cam and a camshaft including the cam, and injecting fuel directly into the combustion chamber.

Yet another aspect may relate to a method of operating an internal combustion engine including at least one cylinder and a piston slidable in the cylinder. The method may include supplying pressurized air from an intake manifold to an air intake port of a combustion chamber in the cylinder; and operating an air intake valve to open the air intake port to allow pressurized air to flow between the combustion chamber and the intake manifold substantially during a portion of a compression stroke of the piston, wherein operating the air intake valve may include operating the air intake valve via at least one rotatable cam associated with the air intake valve. The method may also include shifting rotational phase of at least one of the cam and a camshaft including the cam, and injecting fuel into the combustion chamber after the intake valve is closed, wherein the injecting may include supplying a pilot injection of fuel at a crank angle before a main injection of fuel.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate several exemplary embodiments of the invention and, together with the description, serve to explain the principles of the invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
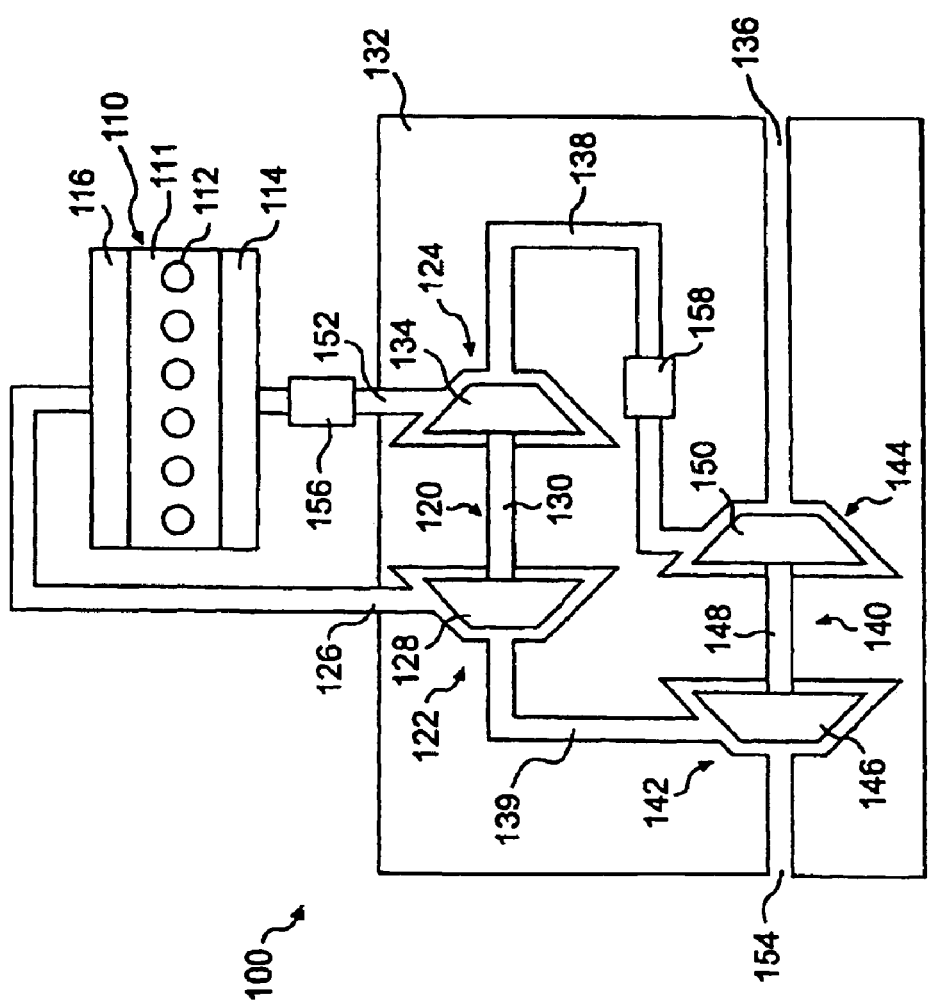
FIG. 1 is a combination diagrammatic and schematic illustration of an exemplary air supply system for an internal combustion engine in accordance with the invention.

Referring to FIG. 1, an exemplary air supply system 100 for an internal combustion engine 110, for example, a four-stroke, diesel engine, is provided. (It should be appreciated that the engine 110 may be any other type of internal combustion engine, for example, a gasoline or natural gas engine.) The internal combustion engine 110 includes an engine block 111 defining a plurality of combustion cylinders 112, the number of which depends upon the particular application. For example, a 4-cylinder engine would include four combustion cylinders, a 6-cylinder engine would include six combustion cylinders, etc. In the exemplary embodiment of FIG. 1, six combustion cylinders 112 are shown.

The internal combustion engine 110 also includes an intake manifold 114 and an exhaust manifold 116. The intake manifold 114 provides fluid, for example, air or a fuel/air mixture, to the combustion cylinders 112. The exhaust manifold 116 receives exhaust fluid, for example, exhaust gas, from the combustion cylinders 112. The intake manifold 114 and the exhaust manifold 116 are shown as a single-part construction for simplicity in the drawing. However, it should be appreciated that the intake manifold 114 and/or the exhaust manifold 116 may be constructed as multi-part manifolds, depending upon the particular application.

The air supply system 100 includes a first turbocharger 120 and may include a second turbocharger 140. The first and second turbochargers 120, 140 may be arranged in series with one another such that the second turbocharger 140 provides a first stage of pressurization and the first turbocharger 120 provides a second stage of pressurization. For example, the second turbocharger 140 may be a low pressure turbocharger and the first turbocharger 120 may be a high pressure turbocharger. The first turbocharger 120 includes a turbine 122 and a compressor 124. The turbine 122 is fluidly connected to the exhaust manifold 116 via an exhaust duct 126. The turbine 122 includes a turbine wheel 128 carried by a shaft 130, which in turn may be rotatably carried by a housing 132, for example, a single-part or multi-part housing. The fluid flow path from the exhaust manifold 116 to the turbine 122 may include a variable nozzle (not shown) or other variable geometry arrangement adapted to control the velocity of exhaust fluid impinging on the turbine wheel 128.

The compressor 124 includes a compressor wheel 134 carried by the shaft 130. Thus, rotation of the shaft 130 by the turbine wheel 128 in turn may cause rotation of the compressor wheel 134.

The first turbocharger 120 may include a compressed air duct 138 for receiving compressed air from the second turbocharger 140 and an air outlet line 1230 for receiving compressed air from the compressor 124 and supplying the compressed air to the intake manifold 114 of the engine 110. The first turbocharger 120 may also include an exhaust duct 139 for receiving exhaust fluid from the turbine 122 and supplying the exhaust fluid to the second turbocharger 140.

The second turbocharger 140 may include a turbine 142 and a compressor 144. The turbine 142 may be fluidly connected to the exhaust duct 139. The turbine 142 may include a turbine wheel 146 carried by a shaft 148, which in turn may be rotatably carried by the housing 132. The compressor 144 may include a compressor wheel 150 carried by the shaft 148. Thus, rotation of the shaft 148 by the turbine wheel 146 may in turn cause rotation of the compressor wheel 150.

The second turbocharger 140 may include an air intake line 136 providing fluid communication between the atmosphere and the compressor 144. The second turbocharger 140 may also supply compressed air to the first turbocharger 120 via the compressed air duct 138. The second turbocharger 140 may include an exhaust outlet 154 for receiving exhaust fluid from the turbine 142 and providing fluid communication with the atmosphere. In an embodiment, the first turbocharger 120 and second turbocharger 140 may be sized to provide substantially similar compression ratios. For example, the first turbocharger 120 and second turbocharger 140 may both provide compression ratios of between 2 to 1 and 3 to 1, resulting in a system compression ratio of at least 4:1 with respect to atmospheric pressure. Alternatively, the second turbocharger 140 may provide a compression ratio of 3 to 1 and the first turbocharger 120 may provide a compression ratio of 1.5 to 1, resulting in a system compression ratio of 4.5 to 1 with respect to atmospheric pressure.

The air supply system 100 may include an air cooler 156, for example, an aftercooler, between the compressor 124 and the intake manifold 114. The air cooler 156 may extract heat from the air to lower the intake manifold temperature and increase the air density. Optionally, the air supply system 100 may include an additional air cooler 158, for example, an intercooler, between the compressor 144 of the second turbocharger 140 and the compressor 124 of the first turbocharger 120. Intercooling may use techniques such as jacket water, air to air, and the like. Alternatively, the air supply system 100 may optionally include an additional air cooler (not shown) between the air cooler 156 and the intake manifold 114. The optional additional air cooler may further reduce the intake manifold temperature. A jacket water pre-cooler (not shown) may be used to protect the air cooler 156.

Figure 2:
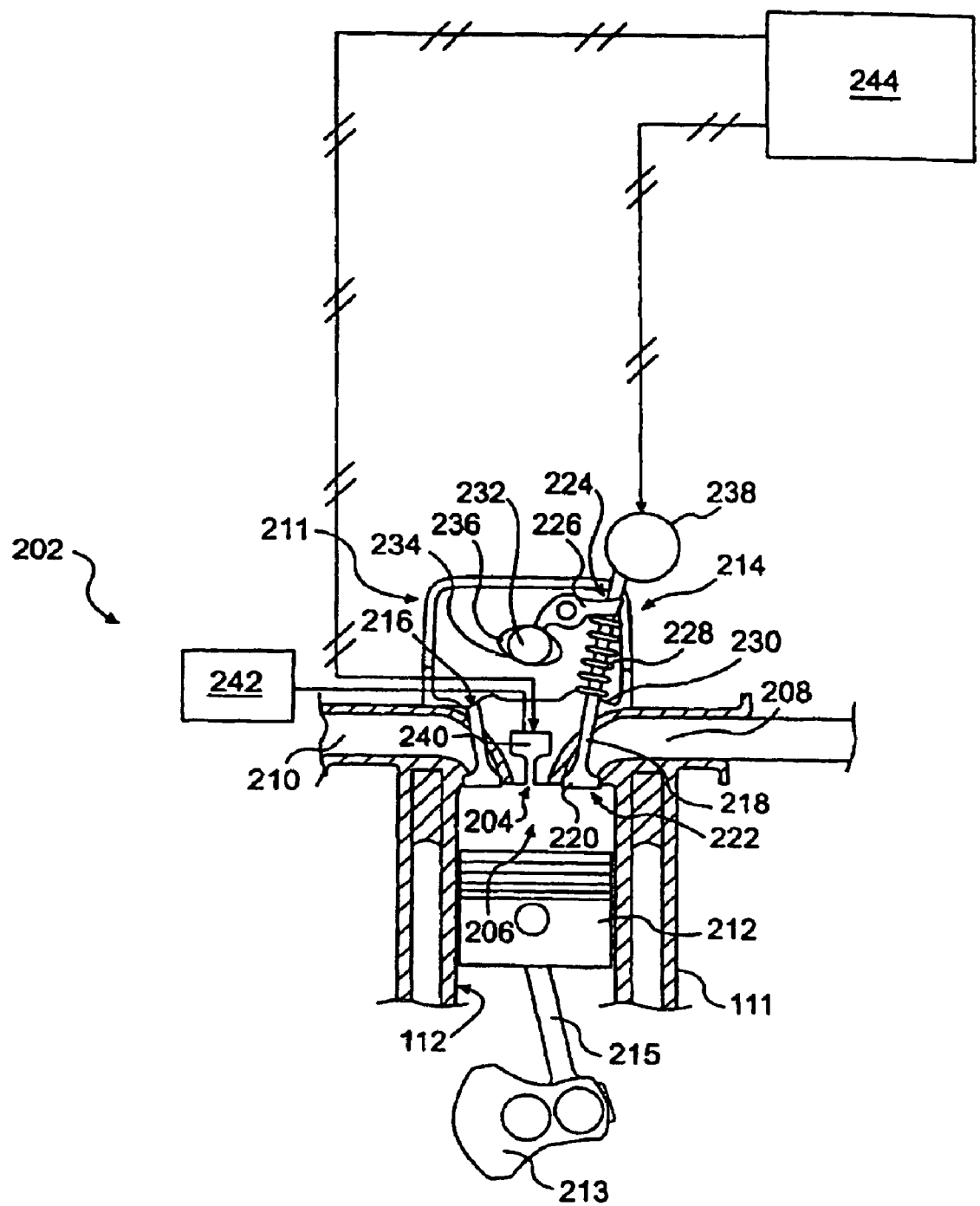
FIG. 2 is a combination diagrammatic and schematic illustration of an exemplary engine cylinder in accordance with the invention.

Referring now to FIG. 2, a cylinder head 211 may be connected with the engine block 111. Each cylinder 112 in the cylinder head 211 may be provided with a fuel supply system 202. The fuel supply system 202 may include a fuel port 204 opening to a combustion chamber 206 within the cylinder 112. The fuel supply system 202 may inject fuel, for example, diesel fuel, directly into the combustion chamber 206. Intake gases may be directed from intake manifold 34 through intake passageway 30 to combustion chamber 24.

The cylinder 112 may contain a piston 212 slidably movable in the cylinder. A crankshaft 213 may be rotatably disposed within the engine block 111. A connecting rod 215 may couple the piston 212 to an eccentric crankpin 219 (FIG. 3) of the crankshaft 213 so that sliding motion of the piston 212 within the cylinder 112 results in rotation of the crankshaft 213. Similarly, rotation of the crankshaft 213 results in a sliding motion of the piston 212. For example, an uppermost position of the piston 212 in the cylinder 112 corresponds to a top dead center position of the crankshaft 213, and a lowermost position of the piston 212 in the cylinder 112 corresponds to a bottom dead center position of the crankshaft 213.

As one skilled in the art will recognize, the piston 212 in a conventional, four-stroke engine cycle reciprocates between the uppermost position and the lowermost position during a combustion (or expansion) stroke, an exhaust stroke, and intake stroke, and a compression stroke. Meanwhile, the crankshaft 213 rotates from the top dead center position to the bottom dead center position during the combustion stroke, from the bottom dead center to the top dead center during the exhaust stroke, from top dead center to bottom dead center during the intake stroke, and from bottom dead center to top dead center during the compression stroke. Then, the four-stroke cycle begins again. Each piston stroke correlates to about 180° of crankshaft rotation, or crank angle. Thus, the combustion stroke may begin at about 0° crank angle, the exhaust stroke at about 180°, the intake stroke at about 360°, and the compression stroke at about 540°.

Figure 3:
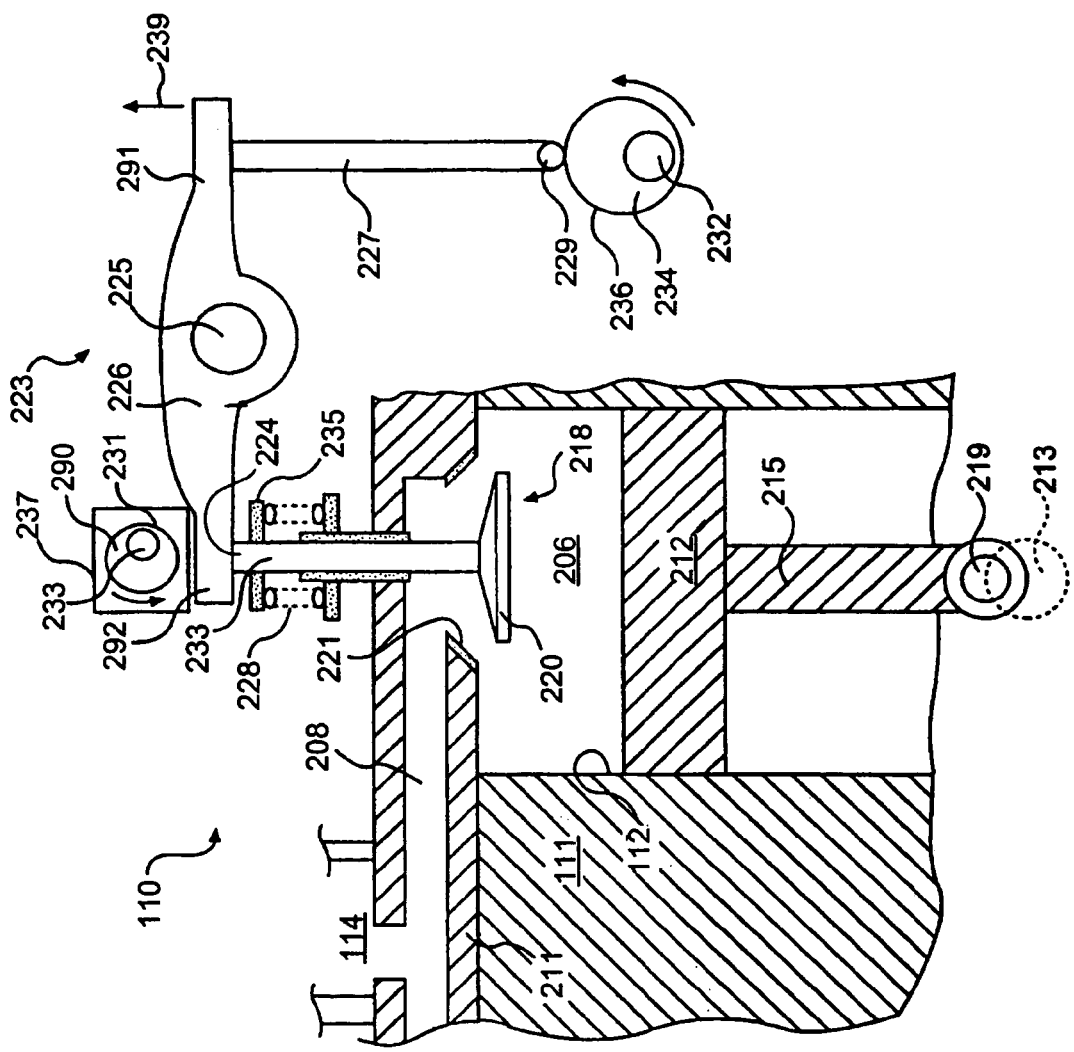
FIG. 3 is a schematic and diagrammatic illustration of an exemplary engine valve actuation system for the engine of FIG. 1.

The cylinder 112 may include at least one intake port 208 and at least one exhaust port 210, each opening to the combustion chamber 206. The intake port 208 may be opened and closed by an intake valve assembly 214, and the exhaust port 210 may be opened and closed by an exhaust valve assembly 216. The intake valve assembly 214 may include, for example, an intake valve 218 having a head 220 at a first end 222, with the head 220 being sized and arranged to selectively close the intake port 208. As shown in FIG. 3, the intake valve head 220 is configured to selectively engage a seat 221, in the opening of the combustion chamber 206. The second end 224 of the intake valve 218 may be connected to a rocker arm 226 or any other conventional valve-actuating mechanism. The intake valve 218 may be movable between a first position permitting flow from the intake manifold 114 to enter the combustion cylinder 112 and a second position where intake valve head 220 engages seat 221, substantially blocking flow from the intake manifold 114 to the combustion cylinder 112. A spring 228 may be disposed about the intake valve 218 to bias the intake valve 218 to the second, closed position.

A camshaft 232 carrying a cam 234 with one or more lobes 236 may be arranged to operate the intake valve assembly 214 cyclically based on the configuration of the cam 234, the lobes 236, and the rotation of the camshaft 232 to achieve a desired intake valve timing. The camshaft 232 is operatively engaged with crankshaft 213 of engine 110. Camshaft 232 may be connected with crankshaft 213 in any manner readily apparent to one skilled in the art where rotation of crankshaft 213 will result in corresponding rotation of camshaft 232. For example, camshaft 232 may be connected to crankshaft 213.through a gear train that reduces the rotational speed of camshaft 232 to approximately one half of the rotational speed of crankshaft 213. As explained in more detail below, the shape of cam lobe 236 may at least partially determine at least part of the actuation timing of the valve 218. One skilled in the art will recognize that cam 234 may include more than one cam lobe and/or the cam lobe may have a different configuration depending upon the desired intake valve actuation timing.

The exhaust valve assembly 216 of FIG. 2 may be configured in a manner similar to the intake valve assembly 214 and may be operated by one of the lobes 236 of the cam 234. In an embodiment, the intake lobe 236 may be configured to operate the intake valve 218 in a conventional Otto or diesel cycle, whereby the intake valve 218 moves to the second position from between about 10° before bottom dead center of the intake stroke and about 10° after bottom dead center of the compression stroke. Alternatively (or additionally), the intake valve assembly 214 and/or the exhaust valve assembly 216 may be operated hydraulically, pneumatically, electronically, or by any combination of mechanics, hydraulics, pneumatics, and/or electronics.

The intake valve assembly 214 may include a variable intake valve closing mechanism 238 structured and arranged to selectively interrupt cyclical movement of and extend (and/or shorten) the closing timing of the intake valve 218. The variable intake valve closing mechanism 238 may be operated hydraulically, pneumatically, electronically, mechanically (e.g. by including a phase shifting device 237 shown in FIG. 5 and/or a second cam 290 shown in FIGS. 3–5), or any combination thereof. For example, the variable intake valve closing mechanism 238 may be selectively operated to supply hydraulic fluid, for example, at a low pressure or a high pressure, in a manner to resist closing of the intake valve 218 by the bias of the spring 228. That is, after the intake valve 218 is lifted, i.e., opened, by the cam 234, and when the cam 234 is no longer holding the intake valve 218 open, the hydraulic fluid may hold the intake valve 218 open for a desired period. The desired period may change depending on the desired performance of the engine 110. Thus, the variable intake valve closing mechanism 238 enables the engine 110 to operate under a conventional Otto or diesel cycle or under a variable late-closing and/or early-closing Miller cycle.

Referring now to FIG. 3, engine 110 may include a series of valve actuation assemblies 223 (one of which is illustrated in FIG. 3). One valve actuation assembly 223 may be provided to move intake valve head 220 between the first and second positions. Another valve actuation assembly may be provided to move an exhaust valve element (not shown) between the first and second positions.

It should be noted that each cylinder 112 may include multiple intake openings and exhaust openings (not shown). Each such opening will have an associated intake valve head 220 or exhaust valve element (not shown). Engine 110 may include two valve actuation assemblies 223 for each cylinder. The first valve actuation assembly may be configured to actuate each of the intake valve heads 220 for each cylinder 112 and the second valve actuation assembly may be configured to actuate each of the exhaust valve elements. Alternatively, engine 110 may include a separate valve actuation assembly to actuate each intake valve head 220 and each exhaust valve element.

Each valve actuation assembly 223 includes a rocker arm 226 that includes a first end 291, a second end 292, and a pivot point 225. First end 291 of rocker arm 226 may be operatively engaged with cam 234 through a push rod 227 and a cam follower 229. (Alternatively, the rocker arm 226 may be more directly engaged with the cam 234, as shown schematically in FIG. 2, without having the push rod and/or cam follower.) Cam follower 229 remains engaged with the surface of cam lobe 236 as cam 234 rotates. The rotation of cam 234 causes a reciprocating motion of push rod 227 and a pivoting motion of rocker arm 226 about pivot point 225. Second end 292 of rocker arm 226 is operatively engaged with intake valve head 220 through a valve stem 233.

Valve actuation assembly 223 may also include a valve spring 228. Valve spring 228 may act on valve stem 233 through a locking nut 235. Valve spring 228 may act to move intake valve head 220 relative to cylinder head 211. In the illustrated embodiment, valve spring 228 acts to bias intake valve head 220 into its closed position, where intake valve head 220 engages seat 221 to prevent a flow of fluid relative to opening of combustion chamber 206. Thus, the rotation of cam 234 will cause intake valve 218 to move from the closed position to the open position for a first lift period.

A second cam 290 may be operatively engaged with intake valve 218. Second cam may include a cam lobe 231 having, for example, an elliptical surface. Second cam 290 may be mounted on a camshaft 233 to rotate with camshaft 233. Second cam 290 may be adapted to affect the movement of intake valve 218. For example, second cam 290 may act to open intake valve 218, delay the movement of intake valve 218, or retard the movement of intake valve 218. As will be explained in greater detail below, under certain circumstances, the rotational phase of second cam 290 (and/or the rotational phase of the cam 234) may be adjusted so that second cam 290 does not alter the movement of intake valve 218.

Figure 4:
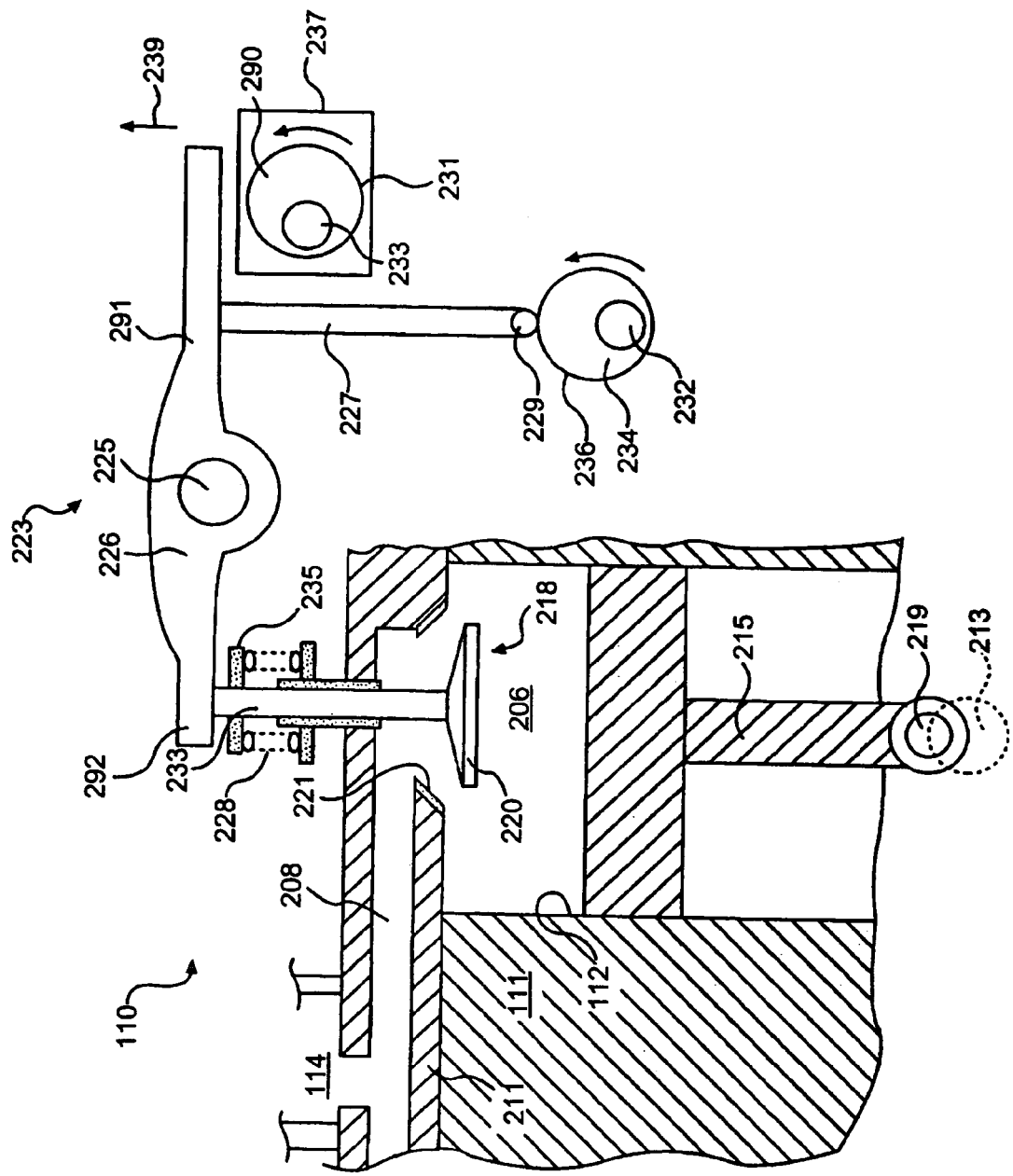
FIG. 4 is a schematic and diagrammatic illustration of another exemplary engine valve actuation system.

As shown in FIG. 3, second cam 290 may be disposed adjacent second end 292 of rocker arm 226. Alternatively, as shown in FIG. 4, second cam 290 may be disposed adjacent first end 291 of rocker arm 226. In either location, second cam 290 is adapted to engage the respective end of rocker arm 226 to cause rocker arm 226 to pivot about pivot point 225 to thereby move intake valve 218 from the first position to the second position for a second lift period.

It should be noted that the second lift period may overlap with the first lift period. In other words, first cam 234 may have already lifted intake valve 218 so as to place intake valve 218 in its open position before cam lobe 231 of second cam 290 rotates to engage rocker arm 226. In this situation, second cam 290 may not cause contact with (and/or movement of) rocker arm 226 as first cam 234 may have already caused rocker arm 226 to pivot and lift intake valve 218.

Figure 5:
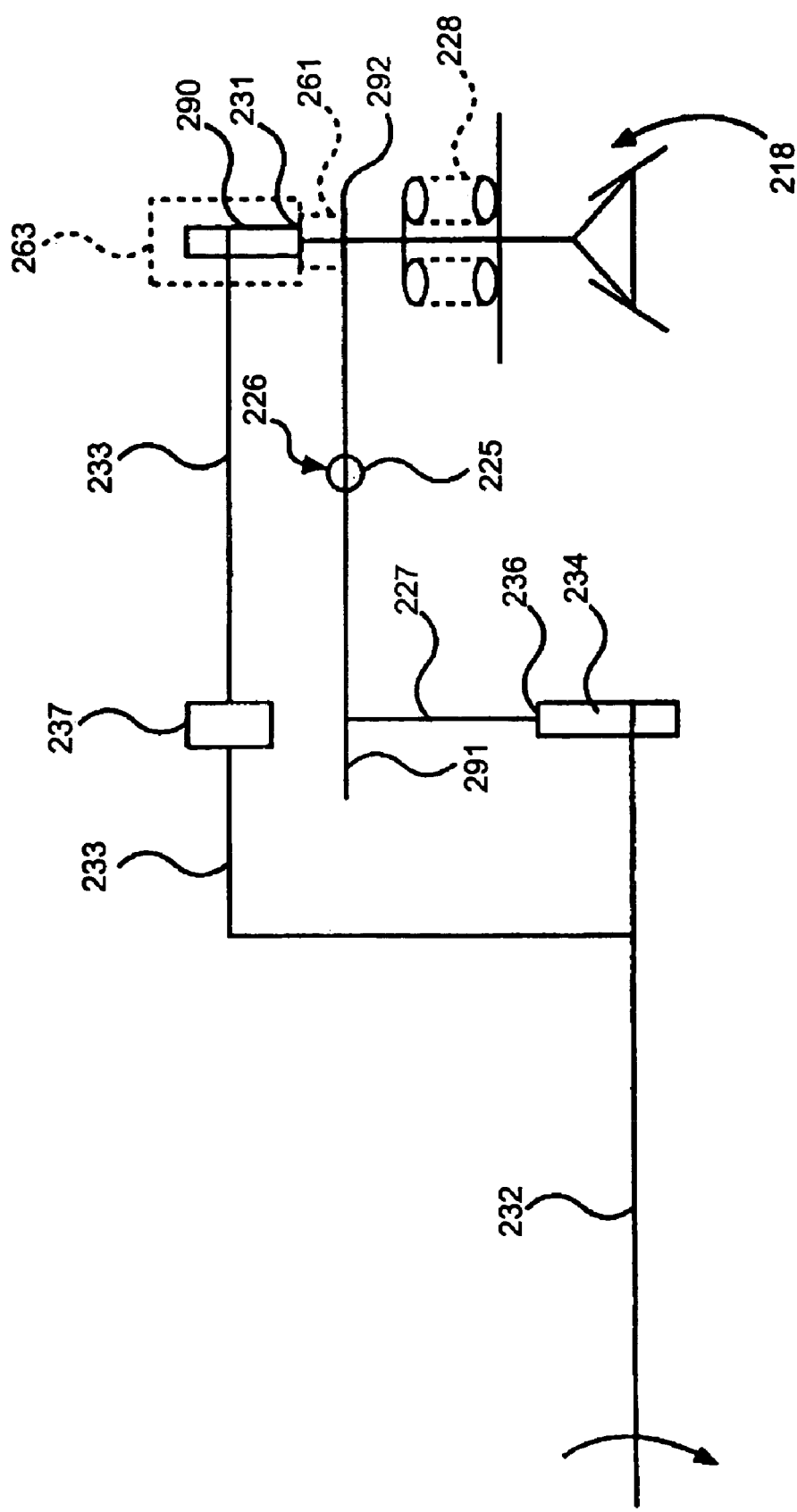
FIG. 5 is a schematic illustration of a further exemplary engine valve actuation system.

As schematically shown in FIG. 5, a phase shifting device 237 may be disposed along camshaft 233. (Alternatively, or additionally, a phase shifting device may be disposed along camshaft 232.) Phase shifting device 237 is operable to adjust the rotational phase of camshaft 233 and/or second cam 290. Phase shifting device 237 may advance or retard the rotational phase of camshaft 233 and/or second cam 290 relative to camshaft 232. Once the phase shift is complete, camshafts 232 and 233 will continue to rotate at the same speed, e.g. approximately one-half the speed of crankshaft 213 (referring to FIGS. 3 and 4). However, the position of cam lobe 231 of second cam 290 will have shifted relative to the position of cam lobe 236 of first cam 234.

Figure 6:
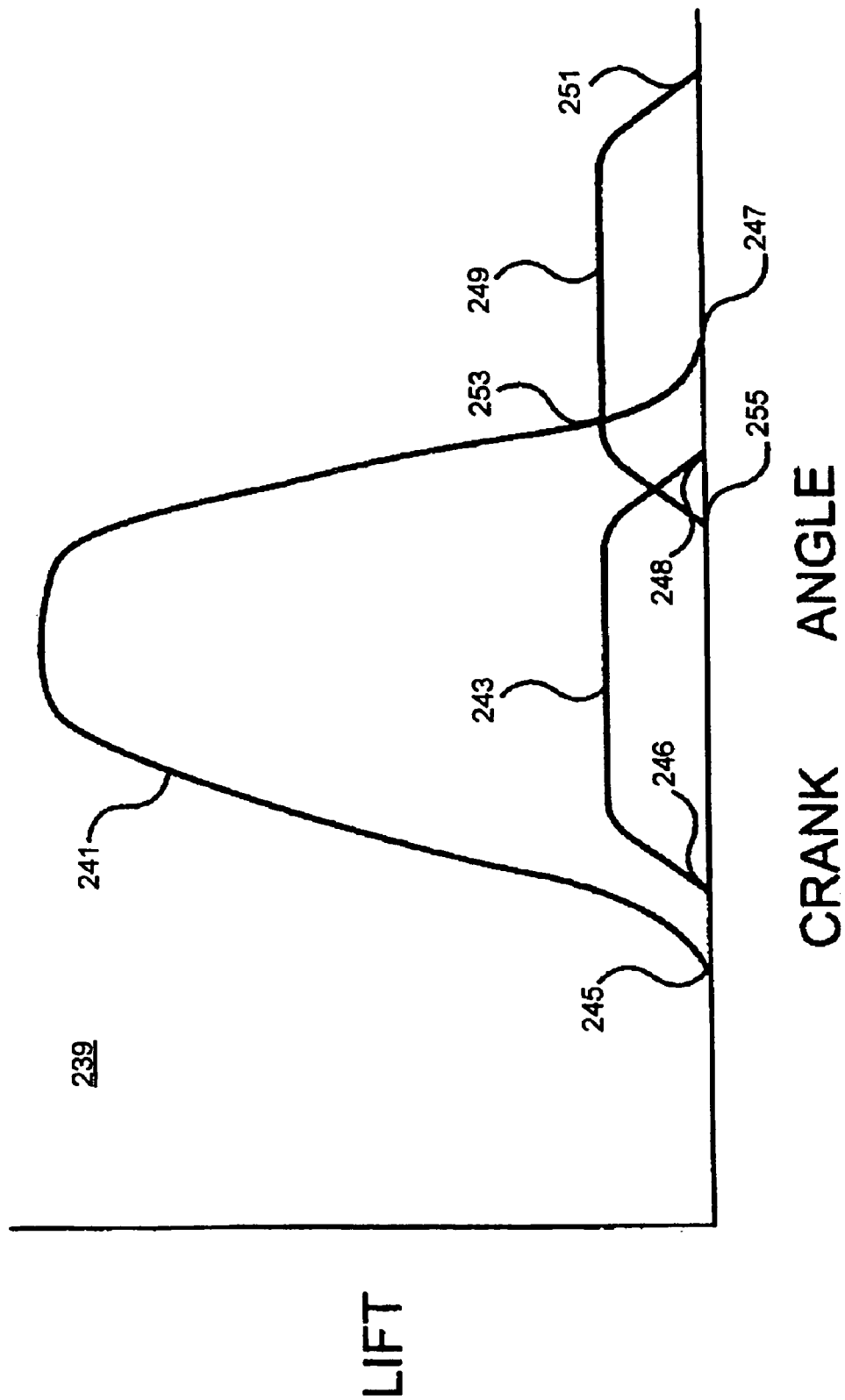
FIG. 6 is a graph illustrating exemplary valve actuation periods for an engine valve actuation system in accordance with the present invention.

For example, FIG. 6 illustrates a graph 239 depicting a first lift period 241 such as may be initiated by first cam 234 and a second lift period 243 such as may be initiated by second cam 290. First lift period 241 includes a start 245 and an end 247. Second lift period includes a start 246 and an end 248. In an exemplary base phasing position, first and second lift periods 241 and 243 will overlap. When the first and second lift periods 241 and 243 overlap, the lifting of intake valve 218 may be controlled entirely by first cam 234.

Phase shifting device 237 may be operated to delay the rotational phase of cam shaft 233 and/or cam 290 with respect to cam shaft 232. A delayed second lift period 249 is also illustrated in FIG. 6. As shown, delayed second lift period 249 has a start 255 and an end 251. The phase change delays the engagement of second cam 290 with rocker arm 226. Thus, second cam 290 will delay the closing of intake valve 218 to end 251, which may correspond to a crank angle where the piston 212 is either beyond, at, or before bottom dead center of the intake stroke so as to enable late and/or early Miller cycle operation of the intake valve 218. Control over the movement of intake valve 218 will be transferred from first cam 234 to second cam 290 at a transfer point 253 (e.g., where the second cam 290 begins acting to hold the intake valve 218 open). Thus, by changing the rotational phase of second cam 230 relative to first cam 234, the actuation period of intake valve 218 may be varied.

Figure 8:
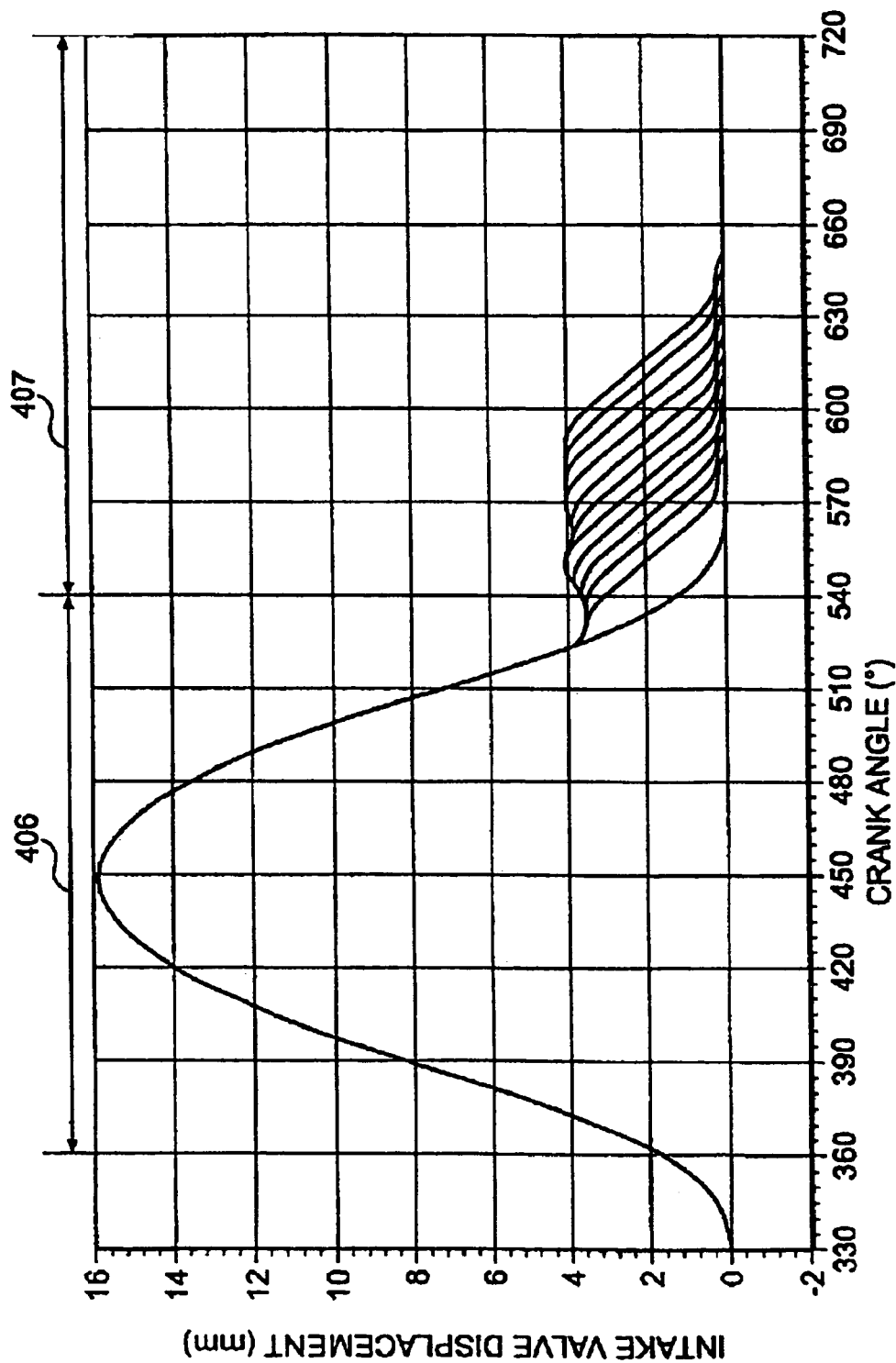
FIG. 8 is a graph illustrating an exemplary intake valve actuation as a function of engine crank angle in accordance with the present invention.

As shown in FIG. 8, the intake valve 218 may begin to open at about 360° crank angle, that is, when the crankshaft 213 is at or near a top dead center position of an intake stroke 406. In some examples, closing of the intake valve 218 may be selectively varied from about 540° crank angle, that is, when the crankshaft 213 is at or near a bottom dead center position of a compression stroke 407 (or earlier when the engine is configured to provide early Miller cycle intake valve closure), to about 650° crank angle, that is, about 70° before top center of the combustion stroke 508. Thus, the intake valve 218 may be held open for a majority portion of the compression stroke 407, that is, for more than half of the compression stroke 407, e.g., the first half of the compression stroke 407 and a portion of the second half of the compression stroke 407.

Phase shifting devices capable of shifting the phase of a cam are well known in the art. One skilled in the art will recognize that phase shifting device 237 may include any means for changing the rotational phase of a shaft and/or cam, such as, for example, a camshaft shift, a cam lobe shift, a hydraulic device, an indexing motor, or a mechanical or hydraulic cam shifting mechanism. In addition, phase shifting device 237 may include a synchronous motor, a mechanical drive with relative angular position based phasing, or any other similar synchronous phasing device.

In alternative engine embodiments, a phase shifting device may be associated with the camshaft 232 and/or cam 236 so as to change the rotational phase of camshaft 232 and/or cam 236 and thereby provide variations in the timing of intake valve closure so as to permit late and/or early Miller cycle operation.

Further shown in FIG. 5 is an impact absorbing device 261 that may be positioned between second cam 290 and second end 292 of rocker arm 226. Impact absorbing device 261 may include any means for decreasing the impact on rocker arm 226 when second cam 290 engages rocker arm 226. For example, impact absorbing device 261 may be a cam that acts to decelerate the rocker arm or intake valve just prior to transfer point 253. Alternatively, impact absorbing device 261 may include a travel limited hydraulic lifter or a spring/damper combination.

In addition, an adjustment device 263 may be operatively associated with second cam 290 and/or impact absorbing device 261. Adjustment device 263 may be adapted to adjust the position of second cam 290 relative to rocker arm 226. Adjustment device 263 may be used to compensate for manufacturing tolerances and/or changes in the size of components due to temperature changes. Adjustment device 263 may include any means for changing the position of second cam 290 relative to rocker arm 226. For example, adjustment device 263 may include threads, nuts, springs, detents, or any other similar position adjusting mechanism.

The fuel supply system 202 may include a fuel injector assembly 240, for example, a mechanically-actuated, electronically-controlled unit injector, in fluid communication with a common fuel rail 242. Alternatively, the fuel injector assembly 240 may be any common rail type injector and may be actuated and/or operated hydraulically, mechanically, electrically, piezo-electrically, or any combination thereof. The common fuel rail 242 provides fuel to the fuel injector assembly 240 associated with each cylinder 112. The fuel injector assembly 240 may inject or otherwise spray fuel into the cylinder 112 via the fuel port 204 in accordance with a desired timing.

A controller 244 may be electrically connected to the variable intake valve closing mechanism 238 (e.g., phase shifting device 237) and/or the fuel injector assembly 240. The controller 244 may be configured to control operation of the variable intake valve closing mechanism 238 (e.g., control the phase shifting device 237 to change cam/camshaft rotational phase) and/or the fuel injector assembly 240 based on one or more engine conditions, for example, engine speed, load, pressure, and/or temperature in order to achieve a desired engine performance. It should be appreciated that the functions of the controller 244 may be performed by a single controller or by a plurality of controllers. Similarly, spark timing in a natural gas engine may provide a similar function to fuel injector timing of a compression ignition engine.

Figure 7:
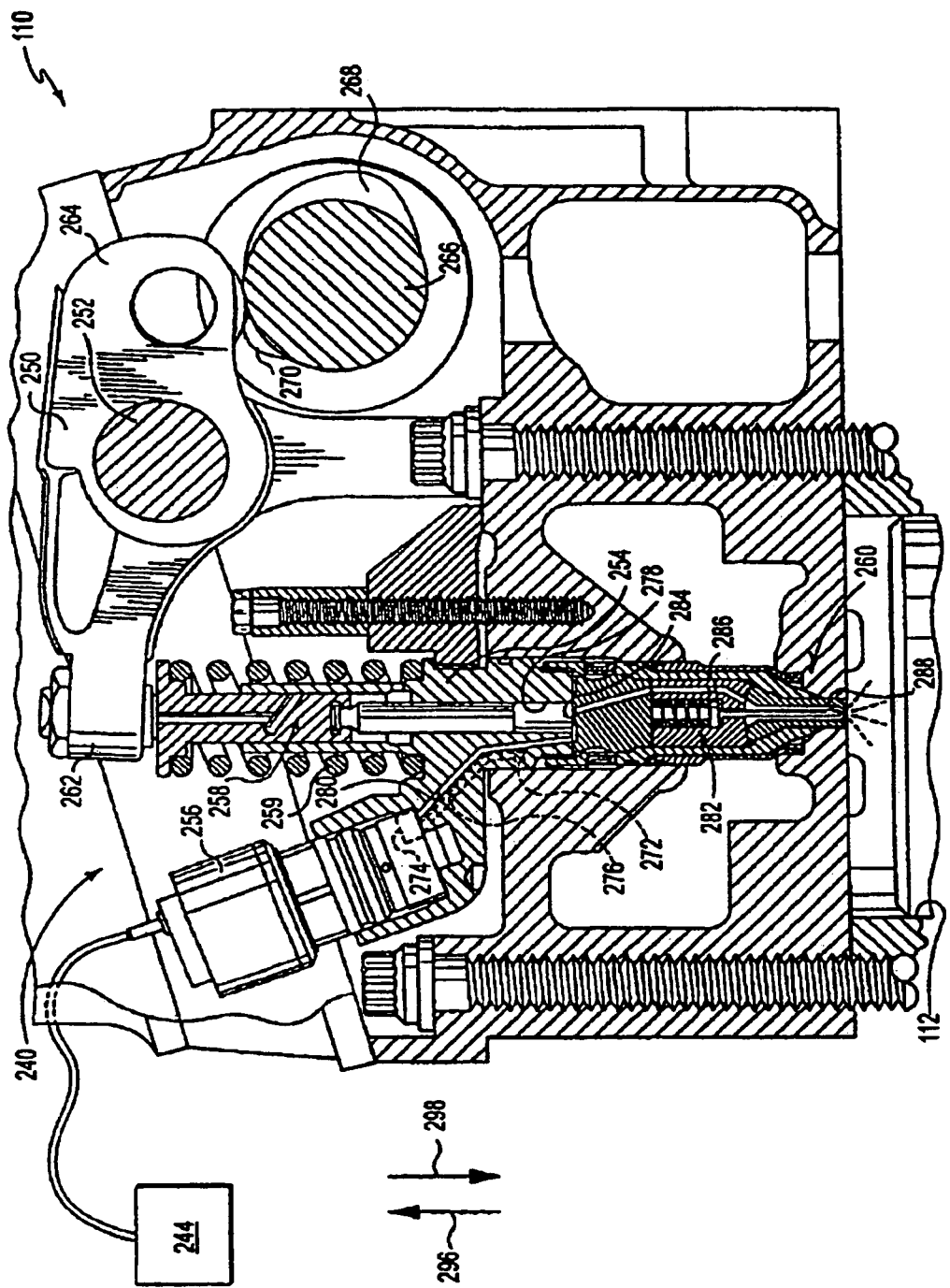
FIG. 7 is a diagrammatic sectional view of the exemplary engine cylinder of FIG. 2.

Referring now to FIG. 7, each fuel injector assembly 240 may be associated with an injector rocker arm 250 pivotally coupled to a rocker shaft 252. Each fuel injector assembly 240 may include an injector body 254, a solenoid 256, a plunger assembly 258, and an injector tip assembly 260. A first end 262 of the injector rocker arm 250 may be operatively coupled to the plunger assembly 258. The plunger assembly 258 may be biased by a spring 259 toward the first end 262 of the injector rocker arm 250 in the general direction of arrow 296.

A second end 264 of the injector rocker arm 250 may be operatively coupled to a camshaft 266. More specifically, the camshaft 266 may include a cam lobe 267 having a first bump 268 and a second bump 270. The camshafts 232, 266 and their respective lobes 236, 267 may be combined into a single camshaft (not shown) if desired. The bumps 268, 270 may be moved into and out of contact with the second end 264 of the injector rocker arm 250 during rotation of the camshaft 266. The bumps 268, 270 may be structured and arranged such that the second bump 270 may provide a pilot injection of fuel at a predetermined crank angle before the first bump 268 provides a main injection of fuel. It should be appreciated that the cam lobe 267 may have only a first bump 268 that injects all of the fuel per cycle.

When one of the bumps 268, 270 is rotated into contact with the injector rocker arm 250, the second end 264 of the injector rocker arm 250 is urged in the general direction of arrow 296. As the second end 264 is urged in the general direction of arrow 296, the rocker arm 250 pivots about the rocker shaft 2230 thereby causing the first end 262 to be urged in the general direction of arrow 298. The force exerted on the second end 264 by the bumps 268, 270 is greater in magnitude than the bias generated by the spring 259, thereby causing the plunger assembly 258 to be likewise urged in the general direction of arrow 298. When the camshaft 266 is rotated beyond the maximum height of the bumps 268, 270, the bias of the spring 259 urges the plunger assembly 258 in the general direction of arrow 296. As the plunger assembly 258 is urged in the general direction of arrow 296, the first end 262 of the injector rocker arm 250 is likewise urged in the general direction of arrow 296, which causes the injector rocker arm 250 to pivot about the rocker shaft 2230 thereby causing the second end 264 to be urged in the general direction of arrow 298.

The injector body 254 defines a fuel port 272. Fuel, such as diesel fuel, may be drawn or otherwise aspirated into the fuel port 272 from the fuel rail 242 when the plunger assembly 258 is moved in the general direction of arrow 296. The fuel port 272 is in fluid communication with a fuel valve 274 via a first fuel channel 276. The fuel valve 274 is, in turn in fluid communication with a plunger chamber 278 via a second fuel channel 280.

The solenoid 256 may be electrically coupled to the controller 244 and mechanically coupled to the fuel valve 274. Actuation of the solenoid 256 by a signal from the controller 244 may cause the fuel valve 274 to be switched from an open position to a closed position. When the fuel valve 274 is positioned in its open position, fuel may advance from the fuel port 272 to the plunger chamber 278, and vice versa. However, when the fuel valve 274 is positioned in its closed positioned, the fuel port 272 is isolated from the plunger chamber 278.

The injector tip assembly 260 may include a check valve assembly 282. Fuel may be advanced from the plunger chamber 278, through an inlet orifice 284, a third fuel channel 286, an outlet orifice 288, and into the cylinder 112 of the engine 110.

Thus, it should be appreciated that when one of the bumps 268, 270 is not in contact with the injector rocker arm 16, the plunger assembly 258 is urged in the general direction of arrow 296 by the spring 259 thereby causing fuel to be drawn into the fuel port 272 which in turn fills the plunger chamber 278 with fuel. As the camshaft 266 is further rotated, one of the bumps 268, 270 is moved into contact with the rocker arm 250, thereby causing the plunger assembly 258 to be urged in the general direction of arrow 298. If the controller 244 is not generating an injection signal, the fuel valve 274 remains in its open position, thereby causing the fuel which is in the plunger chamber 278 to be displaced by the plunger assembly 258 through the fuel port 272. However, if the controller 244 is generating an injection signal, the fuel valve 274 is positioned in its closed position thereby isolating the plunger chamber 278 from the fuel port 272. As the plunger assembly 258 continues to be urged in the general direction of arrow 298 by the camshaft 266, fluid pressure within the fuel injector assembly 240 increases. At a predetermined pressure magnitude, for example, at about 5500 psi (38 MPa), fuel is injected into the cylinder 112.

Fuel will continue to be injected into the cylinder 112 until the controller 244 signals the solenoid 256 to return the fuel valve 274 to its open position.

Figure 9:
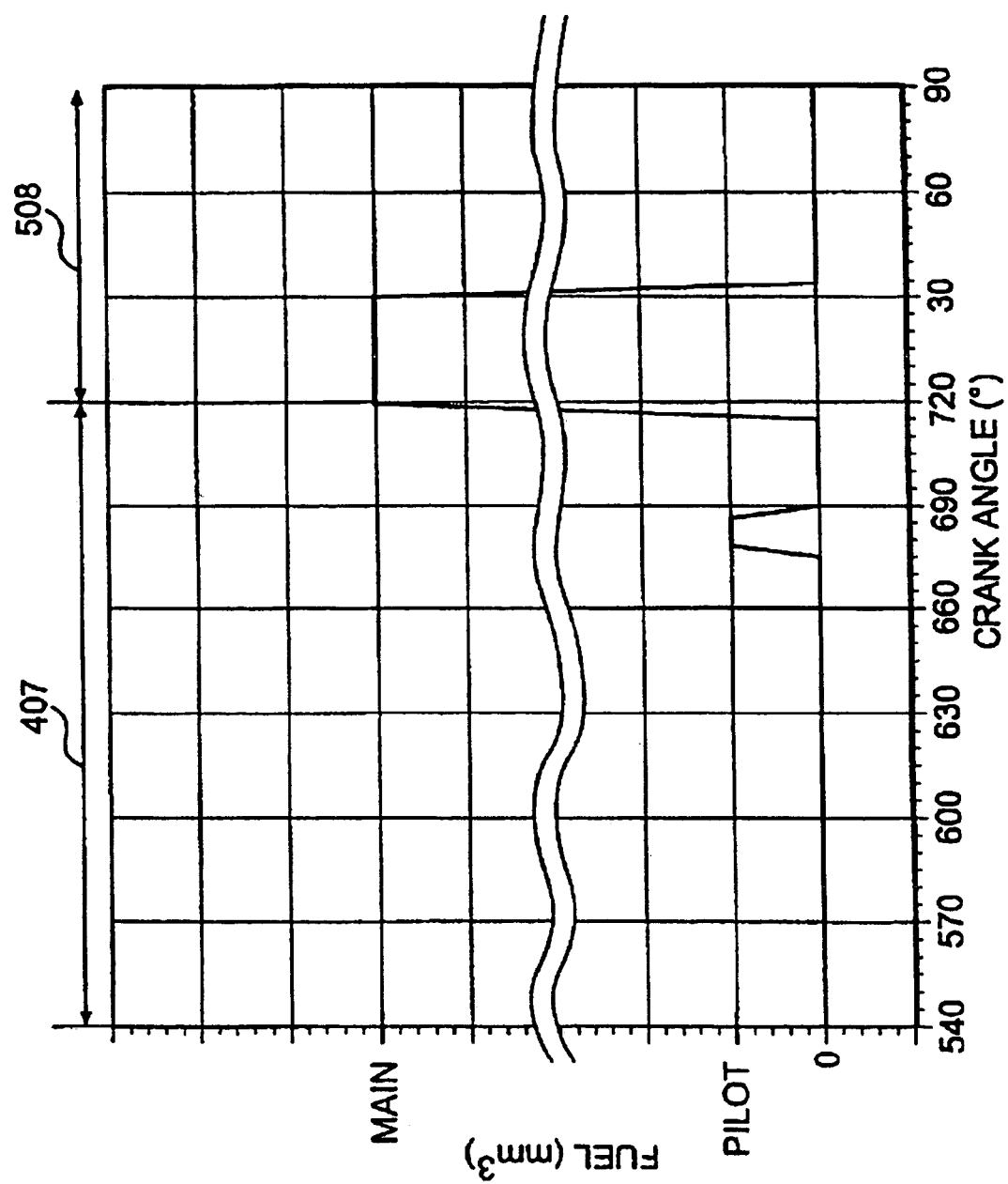
FIG. 9 is a graph illustrating an exemplary fuel injection as a function of engine crank angle in accordance with the present invention.

As shown in the exemplary graph of FIG. 9, the pilot injection of fuel may commence when the crankshaft 213 is at about 675° crank angle, that is, about 45° before top dead center of the compression stroke 407. The main injection of fuel may occur when the crankshaft 213 is at about 710° crank angle, that is, about 100 before top dead center of the compression stroke 407 and about 45° after commencement of the pilot injection. Generally, the pilot injection may commence when the crankshaft 213 is about 40–50° before top dead center of the compression stroke 407 and may last for about 10–15° crankshaft rotation. The main injection may commence when the crankshaft 213 is between about 10° before top dead center of the compression stroke 407 and about 12° after top dead center of the combustion stroke 508. The main injection may last for about 20–45° crankshaft rotation. The pilot injection may use a desired portion of the total fuel used, for example about 10%.

Figure 10:
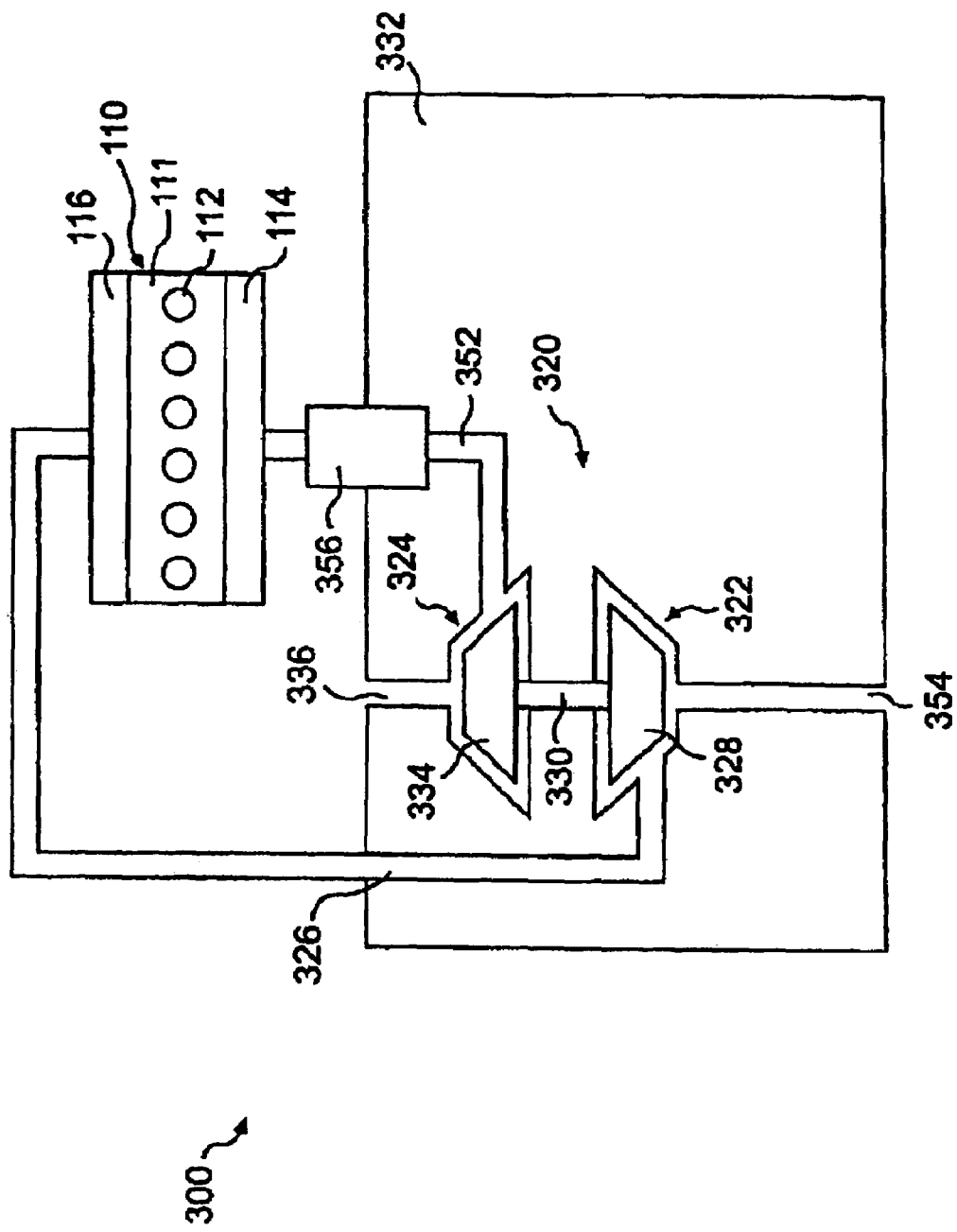
FIG. 10 is a combination diagrammatic and schematic illustration of another exemplary air supply system for an internal combustion engine in accordance with the invention.

FIG. 10 is a combination diagrammatic and schematic illustration of an alternative exemplary air supply system 300 for the internal combustion engine 110. The air supply system 300 may include a turbocharger 320, for example, a high-efficiency turbocharger capable of producing at least about a 4 to 1 compression ratio with respect to atmospheric pressure. The turbocharger 320 may include a turbine 322 and a compressor 324. The turbine 322 may be fluidly connected to the exhaust manifold 116 via an exhaust duct 326. The turbine 322 may include a turbine wheel 328 carried by a shaft 330, which in turn may be rotatably carried by a housing 332, for example, a single-part or multi-part housing. The fluid flow path from the exhaust manifold 116 to the turbine 322 may include a variable nozzle (not shown), which may control the velocity of exhaust fluid impinging on the turbine wheel 328.

The compressor 324 may include a compressor wheel 334 carried by the shaft 330. Thus, rotation of the shaft 330 by the turbine wheel 328 in turn may cause rotation of the compressor wheel 334. The turbocharger 320 may include an air inlet 336 providing fluid communication between the atmosphere and the compressor 324 and an air outlet 3230 for supplying compressed air to the intake manifold 114 of the engine 110. The turbocharger 320 may also include an exhaust outlet 354 for receiving exhaust fluid from the turbine 322 and providing fluid communication with the atmosphere.

The air supply system 300 may include an air cooler 356 between the compressor 324 and the intake manifold 114. Optionally, the air supply system 300 may include an additional air cooler (not shown) between the air cooler 356 and the intake manifold 114.

Figure 11:
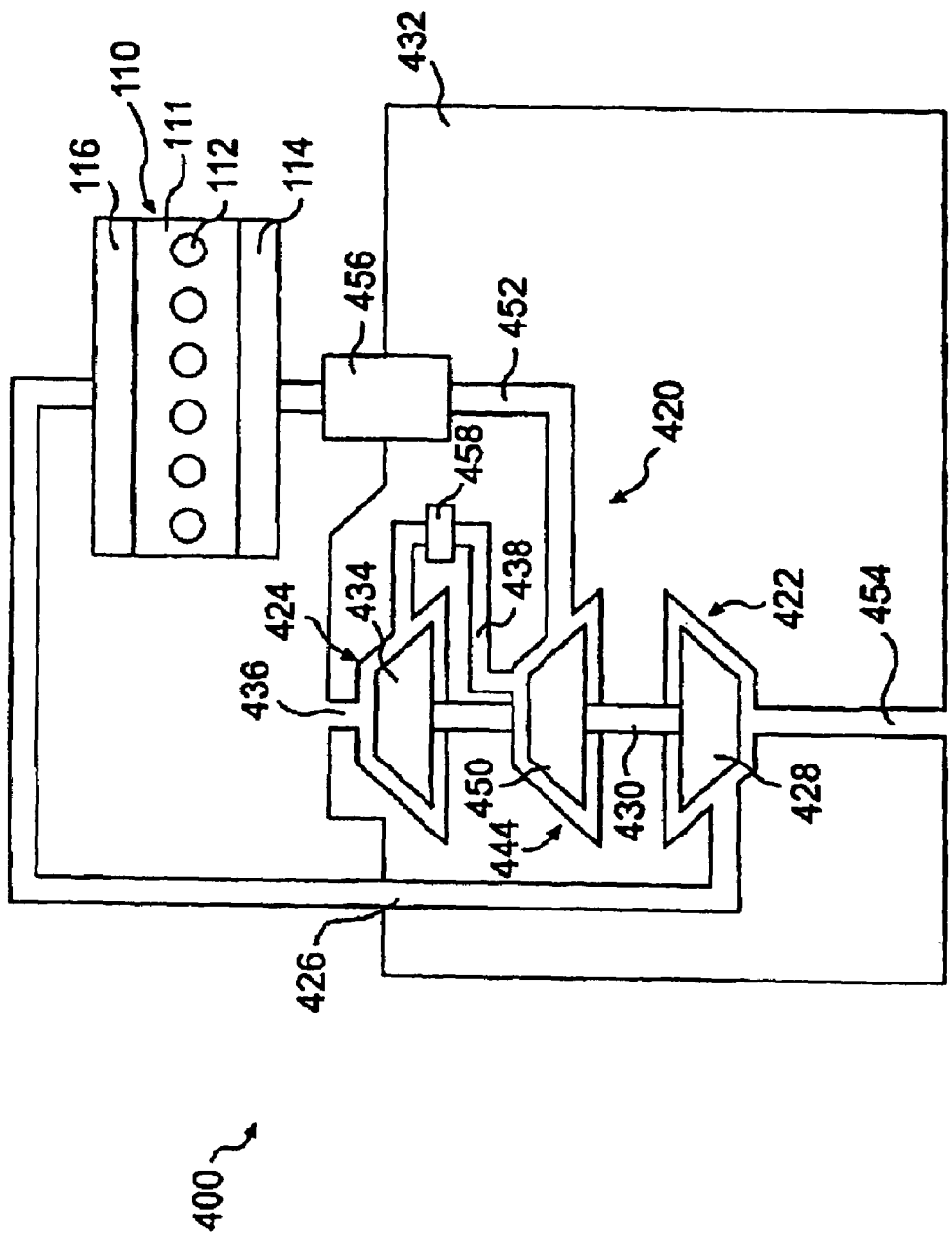
FIG. 11 is a combination diagrammatic and schematic illustration of yet another exemplary air supply system for an internal combustion engine in accordance with the invention.

FIG. 11 is a combination diagrammatic and schematic illustration of another alternative exemplary air supply system 400 for the internal combustion engine 110. The air supply system 400 may include a turbocharger 420, for example, a turbocharger 420 having a turbine 422 and two compressors 424, 444. The turbine 422 may be fluidly connected to the exhaust manifold 116 via an inlet duct 426. The turbine 422 may include a turbine wheel 428 carried by a shaft 430, which in turn may be rotatably carried by a housing 432, for example, a single-part or multi-part housing. The fluid flow path from the exhaust manifold 116 to the turbine 422 may include a variable nozzle (not shown), which may control the velocity of exhaust fluid impinging on the turbine wheel 428.

The first compressor 424 may include a compressor wheel 434 carried by the shaft 430, and the second compressor 444 may include a compressor wheel 450 carried by the shaft 430. Thus, rotation of the shaft 430 by the turbine wheel 428 in turn may cause rotation of the first and second compressor wheels 434, 450. The first and second compressors 424, 444 may provide first and second stages of pressurization, respectively.

The turbocharger 420 may include an air intake line 436 providing fluid communication between the atmosphere and the first compressor 424 and a compressed air duct 438 for receiving compressed air from the first compressor 424 and supplying the compressed air to the second compressor 444. The turbocharger 420 may include an air outlet line 4230 for supplying compressed air from the second compressor 444 to the intake manifold 114 of the engine 110. The turbocharger 420 may also include an exhaust outlet 454 for receiving exhaust fluid from the turbine 422 and providing fluid communication with the atmosphere.

For example, the first compressor 424 and second compressor 444 may both provide compression ratios of between 2 to 1 and 3 to 1, resulting in a system compression ratio of at least 4:1 with respect to atmospheric pressure. Alternatively, the second compressor 444 may provide a compression ratio of 3 to 1 and the first compressor 424 may provide a compression ratio of 1.5 to 1, resulting in a system compression ratio of 4.5 to 1 with respect to atmospheric pressure.

The air supply system 400 may include an air cooler 456 between the compressor 424 and the intake manifold 114. Optionally, the air supply system 400 may include an additional air cooler 458 between the first compressor 424 and the second compressor 444 of the turbocharger 420. Alternatively, the air supply system 400 may optionally include an additional air cooler (not shown) between the air cooler 456 and the intake manifold 114.

Figure 12:
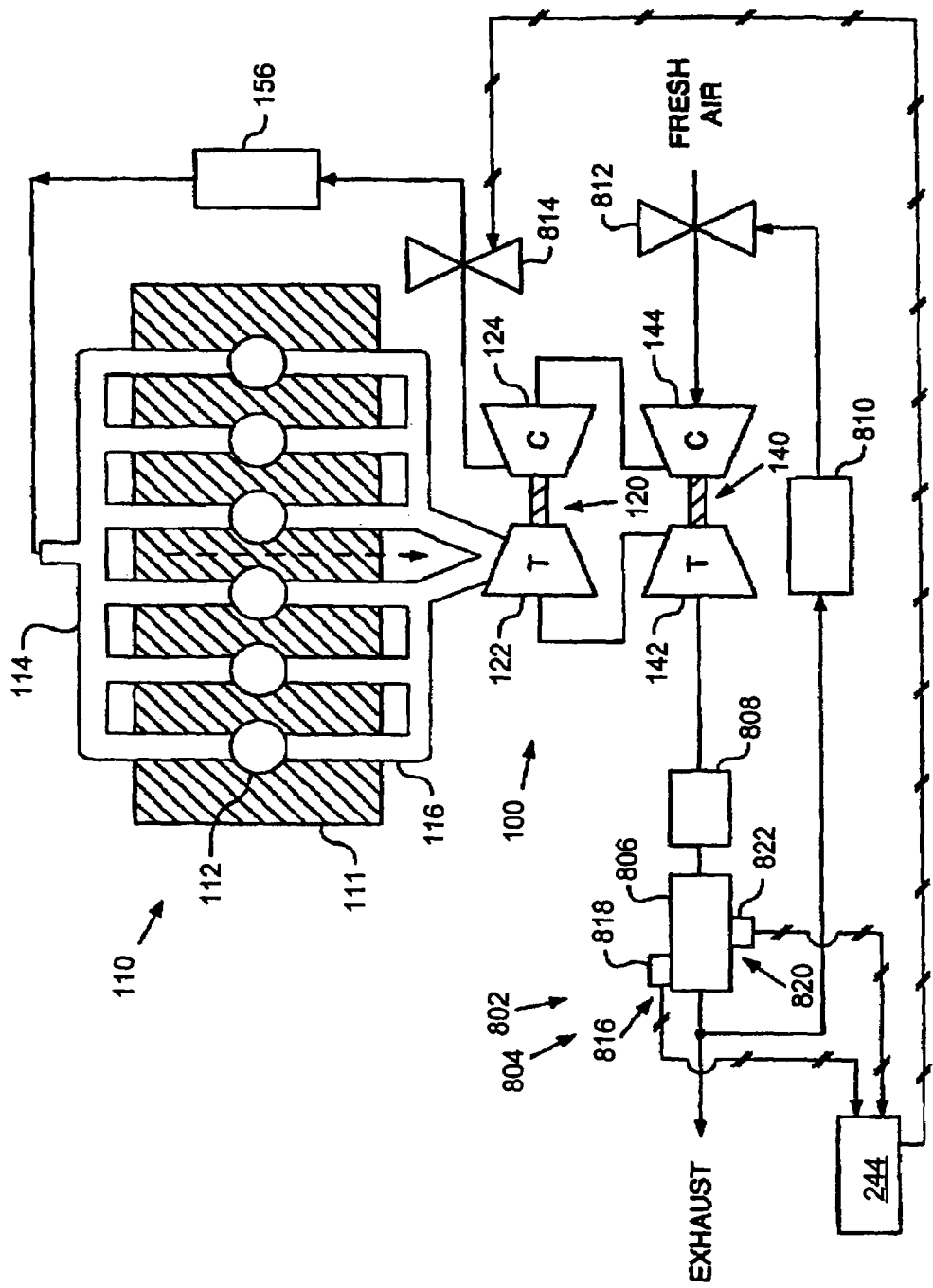
FIG. 12 is a combination diagrammatic and schematic illustration of an exemplary exhaust gas recirculation system included as part of an internal combustion engine in accordance with the invention.

FIG. 12 shows an exemplary exhaust gas recirculation (EGR) system 804 in an exhaust system 802 of combustion engine 110. Combustion engine 110 includes intake manifold 114 and exhaust manifold 116. Engine block 111 provides housing for at least one cylinder 112. FIG. 12 depicts six cylinders 112; however, any number of cylinders 112 could be used, for example, three, six, eight, ten, twelve, or any other number. The intake manifold 114 provides an intake path for each cylinder 112 for air, recirculated exhaust gases, or a combination thereof. The exhaust manifold 116 provides an exhaust path for each cylinder 112 for exhaust gases.

In the embodiment shown in FIG. 12, the air supply system 100 is shown as a two-stage turbocharger system. Air supply system 100 includes first turbocharger 120 having turbine 122 and compressor 124. Air supply system 100 also includes second turbocharger 140 having turbine 142 and compressor 144. The two-stage turbocharger system operates to increase the pressure of the air and exhaust gases being delivered to the cylinders 112 via intake manifold 114, and to maintain a desired air to fuel ratio during extended (and/or reduced) open durations of intake valves. It is noted that a two-stage turbocharger system is not required for operation of the present invention. Other types of turbocharger systems, such as a high pressure ratio single-stage turbocharger system, a variable geometry turbocharger system, and the like, may be used instead. Alternatively, one or more superchargers or other types of compressors may be used.

A throttle valve 814, located between compressor 124 and intake manifold 114, may be used to control the amount of air and recirculated exhaust gases being delivered to the cylinders 112. The throttle valve 814 is shown between compressor 124 and an aftercooler 156. However, the throttle valve 814 may be positioned at other locations, such as-after aftercooler 156. Operation of the throttle valve 814 is described in more detail below.

The EGR system 804 shown in FIG. 12 is typical of a low pressure EGR system in an internal combustion engine. Alternatively, variations of the EGR system 804 may be used, including both low pressure loop and high pressure loop EGR systems. Other types of EGR systems, such as for example by-pass, venturi, piston-pumped, peak clipping, and back pressure, could be used.

An oxidation catalyst 808 receives exhaust gases from turbine 142, and serves to reduce HC emissions. The oxidation catalyst 808 may also be coupled with a De-NO$_x$ catalyst to further reduce NO$_x$ emissions. A particulate matter (PM) filter 806 receives exhaust gases from oxidation catalyst 808. Although oxidation catalyst 808 and PM filter 806 are shown as separate items, they may alternatively be combined into one package.

Some of the exhaust gases are delivered out the exhaust from the PM filter 806. However, a portion of exhaust gases are rerouted to the intake manifold 114 through an EGR cooler 810, through an EGR valve 812, and through first and second turbochargers 120, 140. EGR cooler 810 may be of a type well known in the art, for example a jacket water or an air to gas heat exchanger type.

A means 816 for determining pressure within the PM filter 806 is shown. In one embodiment, the means 816 for determining pressure may includes a pressure sensor 818. However, other alternate means 816 may be employed. For example, the pressure of the exhaust gases in the PM filter 806 may be estimated from a model based on one or more parameters associated with the engine 110. Parameters may include, but are not limited to, engine load, engine speed, temperature, fuel usage, and the like.

A means 820 for determining flow of exhaust gases through the PM filter 806 may be used. The means 820 for determining flow of exhaust gases may include a flow sensor 822. The flow sensor 822 may be used alone to determine pressure in the PM filter 806 based on changes in flow of exhaust gases, or may be used in conjunction with the pressure sensor 818 to provide more accurate pressure change determinations.

INDUSTRIAL APPLICABILITY

During use, the internal combustion engine 110 may operate in a known manner using, for example, the diesel principle of operation. Referring to the exemplary air supply system shown in FIG. 1, exhaust gas from the internal combustion engine 110 is transported from the exhaust manifold 116 through the inlet duct 126 and impinges on and causes rotation of the turbine wheel 128. The turbine wheel 128 is coupled with the shaft 130, which in turn carries the compressor wheel 134. The rotational speed of the compressor wheel 134 thus corresponds to the rotational speed of the shaft 130.

The exemplary fuel supply system 200 and cylinder 112 shown in FIG. 2 may be used with each of the exemplary air supply systems 100, 300, 400. Compressed air is supplied to the combustion chamber 206 via the intake port 208, and exhaust air exits the combustion chamber 206 via the exhaust port 210. The intake valve assembly 214 and the exhaust valve assembly 216 may be controllably operated to direct airflow into and out of the combustion chamber 206.

In a conventional Otto or diesel cycle mode, the intake valve 218 moves from its closed position to its open position in a cyclical fashion to allow compressed air to enter the combustion chamber 206 of the cylinder 112 at near top center of the intake stroke 406 (about 360° crank angle), as shown in FIG. 8. At near bottom dead center of the compression stroke (about 540° crank angle), the intake valve 218 moves from the open position to the closed position to block additional air from entering the combustion chamber 206. Fuel may then be injected from the fuel injector assembly 240 at near top dead center of the compression stroke (about 720° crank angle).

In Miller cycle engine operation, the conventional Otto or diesel cycle is modified by moving the intake valve 218 from the open position to the closed position at either some predetermined time before bottom dead center of the intake stroke 406 (i.e., before 540° crank angle) or some predetermined time after bottom dead center of the compression stroke 407 (i.e., after 540° crank angle). In a conventional late-closing Miller cycle, the intake valve 218 is moved from the first position to the second position during a first portion of the first half of the compression stroke 407.

The operation of engine 110 will cause a rotation of crankshaft 213, which will cause corresponding rotation of camshafts 232 and 233. The rotation of camshaft 232 and first cam 234 causes a reciprocal motion of push rod 227 that pivots rocker arm 226 to start first lift period 241 (referring to FIG. 6) of intake valve 218. First lift period 241 may be coordinated with the movement of piston 212. For example, start 245 of first lift period 241 may coincide with the movement of piston 212 from a top-dead-center position towards a bottom-dead-center position in an intake stroke. The movement of intake valve 218 from the closed position to the open position allows a flow of fluid to enter combustion chamber 206.

The rotation of camshaft 233 will rotate second cam 290 and cam lobe 231 towards rocker arm 226 to initiate second lift period 243 (referring to FIG. 6). However, when second cam 290 is in a base phasing position, second lift period 243 will overlap with first lift period 241. In other words, first cam 234 has already moved intake valve 218 from the first position to the second position and, therefore, cam lobe 231 may not actually engage rocker arm 226 or otherwise impact the lifting movement of intake valve 218.

As first cam 234 and cam lobe 236 continue to rotate, valve spring 228 will act to return intake valve 218 to the closed position and end first lift period 241. End 247 of first lift period 241 may, for example, be timed to coincide with the movement of piston 212 to the bottom-dead-center position at the end of the intake stroke. In some examples, the end 247 of lift period 241 may be at a crank angle where the piston 212 is in its intake stroke and spaced from its bottom dead center position so as to enable selective early intake valve Miller cycle operation. The return of intake valve 218 to the closed position prevents additional fluid from flowing into combustion chamber 206.

Phase shifting device 237 may be operated to change the rotational phase of second cam 290 relative to first cam 234. For example, phase shifting device 237 may delay the rotational phase of second cam 230 relative to first cam 234. When the rotational phase of second cam 230 is delayed, the second lift period 243 will be delayed relative to the first lift period 241.

A delay in the rotational phase of second cam 230 may delay the return of intake valve 218 to its closed position. In a delayed phase position, cam lobe 231 of second cam 290 will rotate into a position to engage rocker arm 226 at a later time, relative to the motion of first cam 234. This may result in cam lobe 231 engaging rocker arm 226 at transfer point 253 (referring to FIG. 6). Cam lobe 231 will therefore prevent intake valve 218 from returning to its closed position until end 251 of delayed second lift period 249 (e.g., hold the intake valve 218 open). End 251 of delayed second lift period 249 may be timed to coincide with a certain movement of piston 212. For example, second lift period 249 may be timed to end after piston 212 moves through a first portion (e.g., a majority portion or less than a majority portion) of a compression stroke, such as in a "late-intake" type Miller cycle. In some other examples (e.g., where end 247 corresponds to a piston position prior to bottom dead center of the intake stroke), the end 251 of second lift period could be before, at, and/or after bottom dead center of the piston's intake stroke to provide "early-intake" and/or "late intake" Miller cycle.

The rotational phase of second cam 230 may be adjusted incrementally between the base phasing position and a fully delayed phasing position. An incremental change in the phasing position of second cam 230 will change the time at which intake valve 218 returns to its closed position relative to the motion of piston 212. For example, an increased delay in the phasing position of second cam 230 may cause intake valve 218 to return to the its closed position after piston 212 has completed a greater portion of an intake stroke. A decreased delay in the phasing position of second cam 230 may cause intake valve 218 to return to its closed position after piston 212 has completed a lesser portion of an intake stroke. In some examples, some of the alternative value displacements of FIG. 8 could be provided. Thus, by changing the rotational phase of second cam 230 the actuation timing of intake valve 218 may be varied.

By shifting the rotational phase of a second cam relative to a first cam, the actuation timing of an engine valve, such as an intake valve or an exhaust valve, may be adjusted. The rotational phase of the second cam may be controlled to implement a variation on a conventional valve timing, such as, for example, a late-intake and/or early intake type Miller cycle.

As mentioned above, some alternative arrangements may include a phase shifting device associated with the cam 234 and/or camshaft 232. Such arrangements may be configured to provide early and/or late Miller cycle operation like that provided by the combination of the second cam and its phase shifting device.

The variable intake valve closing mechanism 238, including the phase shifting device and/or second cam, enables the engine 110 to be operated in a late-closing and/or early-closing Miller cycle and a conventional Otto or diesel cycle. Further, injecting a substantial portion of fuel after top dead center of the combustion stroke 508, as shown in FIG. 5, may reduce $NO_x$ emissions and increase the amount of energy rejected to the exhaust manifold 116 in the form of exhaust fluid. Use of a high-efficiency turbocharger 320, 420 or series turbochargers 120, 140 may enable recapture of at least a portion of the rejected energy from the exhaust. The rejected energy may be converted into increased air pressures delivered to the intake manifold 114, which may increase the energy pushing the piston 212 against the crankshaft 213 to produce useable work. In addition, delaying movement of the intake valve 218 from the first position to the second position may reduce the compression temperature in the combustion chamber 206. The reduced compression temperature may further reduce $NO_x$ emissions.

The controller 244 may operate the variable intake valve closing mechanism 238 (e.g., phase shifting device 237) to vary the timing of the intake valve assembly 214 to achieve desired engine performance based on one or more engine conditions, for example, engine speed, engine load, engine temperature, boost, and/or manifold intake temperature. The variable intake valve closing mechanism 238 may also allow more precise control of the air/fuel ratio. By delaying and/or advancing closing of the intake valve assembly 214, the controller 244 may control the cylinder pressure during the compression stroke of the piston 212. For example, late closing of the intake valve reduces the compression work that the piston 212 must perform without compromising cylinder pressure and while maintaining a standard expansion ratio and a suitable air/fuel ratio.

The high pressure air provided by the exemplary air supply systems 100, 300, 400 may provide extra boost on the induction stroke of the piston 212. The high pressure may also enable the intake valve assembly 214 to be closed even later (and/or even earlier) than in a conventional Miller cycle engine. For example, the intake valve assembly 214 may remain open until the second half of the compression stroke of the piston 212, for example, as late as about 80° to 70° before top dead center (BTDC). While the intake valve assembly 214 is open, air may flow between the chamber 206 and the intake manifold 114. Thus, the cylinder 112 may experience less of a temperature rise in the chamber 206 during the compression stroke of the piston 212.

Since the closing of the intake valve assembly 214 may be delayed, the timing of the fuel supply system may also be retarded. For example, the controller 244 may controllably operate the fuel injector assembly 240 to supply fuel to the combustion chamber 206 after the intake valve assembly 214 is closed. For example, the fuel injector assembly 240 may be controlled to supply a pilot injection of fuel contemporaneous with or slightly after the intake valve assembly 214 is closed and to supply a main injection of fuel contemporaneous with or slightly before combustion temperature is reached in the chamber 206. As a result, a significant amount of exhaust energy may be available for recirculation by the air supply system 100, 300, 400, which may efficiently extract additional work from the exhaust energy.

Referring to the exemplary air supply system 100 of FIG. 1, the second turbocharger 140 may extract otherwise wasted energy from the exhaust stream of the first turbocharger 120 to turn the compressor wheel 150 of the second turbocharger 140, which is in series with the compressor wheel 134 of the first turbocharger 120. The extra restriction in the exhaust path resulting from the addition of the second turbocharger 140 may raise the back pressure on the piston 212. However, the energy recovery accomplished through the second turbocharger 140 may offset the work consumed by the higher back pressure. For example, the additional pressure achieved by the series turbochargers 120, 140 may do work on the piston 212 during the induction stroke of the combustion cycle. Further, the added pressure on the cylinder resulting from the second turbocharger 140 may be controlled and/or relieved by using the late and/or early intake valve closing. Thus, the series turbochargers 120, 140 may provide fuel efficiency via the air supply system 100, and not simply more power.

It should be appreciated that the air cooler 156, 356, 456 preceding the intake manifold 114 may extract heat from the air to lower the inlet manifold temperature, while maintaining the denseness of the pressurized air. The optional additional air cooler between compressors or after the air cooler 156, 356, 456 may further reduce the inlet manifold temperature, but may lower the work potential of the pressurized air. The lower inlet manifold temperature may reduce the $NO_x$ emissions.

Referring again to FIG. 12, a change in pressure of exhaust gases passing through the PM filter 806 results from an accumulation of particulate matter, thus indicating a need to regenerate the PM filter 806, i.e., burn away the accumulation of particulate matter. For example, as particulate matter accumulates, pressure in the PM filter 806 increases.

The PM filter 806 may be a catalyzed diesel particulate filter (CDPF) or an active diesel particulate filter (ADPF). A CDPF allows soot to burn at much lower temperatures. An ADPF is defined by raising the PM filter internal energy by means other than the engine 110, for example electrical heating, burner, fuel injection, and the like.

One method to increase the exhaust temperature and initiate PM filter regeneration is to use the throttle valve 814 to restrict the inlet air, thus increasing exhaust temperature. Other methods to increase exhaust temperature include variable geometry turbochargers, smart wastegates, variable valve actuation, and the like. Yet another method to increase exhaust temperature and initiate PM filter regeneration includes the use of a post injection of fuel, i.e., a fuel injection timed after delivery of a main injection.

The throttle valve 814 may be coupled to the EGR valve 812 so that they are both actuated together. Alternatively, the throttle valve 814 and the EGR valve 812 may be actuated independently of each other. Both valves may operate together or independently to modulate the rate of EGR being delivered to the intake manifold 114.

CDPFs regenerate more effectively when the ratio of $NO_x$, to particulate matter, i.e., soot, is within a certain range, for example, from about 20 to 1 to about 30 to 1. In some examples, an EGR system combined with the above described methods of multiple fuel injections and variable valve timing may result in a $NO_x$ to soot ratio of about 10 to 1. Thus, it may be desirable to periodically adjust the levels of emissions to change the $NO_x$, to soot ratio to a more desired range and then initiate regeneration. Examples of methods which may be used include adjusting the EGR rate and adjusting the timing of main fuel injection.

A venturi (not shown) may be used at the EGR entrance to the fresh air inlet. The venturi would depress the pressure of the fresh air at the inlet, thus allowing EGR to flow from the exhaust to the intake side. The venturi may include a diffuser portion which would restore the fresh air to near original velocity and pressure prior to entry into compressor 144. The use of a venturi and diffuser may increase engine efficiency.

An air and fuel supply system for an internal combustion engine in accordance with the exemplary embodiments of the invention may extract additional work from the engine's exhaust. The system may also achieve fuel efficiency and reduced $NO_x$, emissions, while maintaining work potential and ensuring that the system reliability meets with operator expectations.

It will be apparent to those skilled in the art that various modifications and variations can be made to the subject matter disclosed herein without departing from the invention. Other embodiments of the invention will be apparent to those skilled in the art from consideration of the specification and practice of the invention disclosed herein. It is intended that the specification and examples be considered as exemplary only.

What is claimed is:

1. A method of operating an internal combustion engine including at least one cylinder and a piston slidable in the cylinder, the method comprising:

supplying pressurized air from an intake manifold to an air intake port of a combustion chamber in the cylinder;

operating an air intake valve to open the air intake port to allow pressurized air to flow between the combustion chamber and the intake manifold substantially during a majority portion of a compression stroke of the piston, wherein operating the air intake valve includes operating the air intake valve via at least first and second rotatable cams associated with the air intake valve; and shifting rotational phase of at least one of the first cam and a camshaft including the first cam;

wherein the engine has a variable compression ratio;

wherein the engine includes an adjustment device adapted to adjust the position of the second cam relative to a rocker arm operably coupled with the air intake valve.

2. The method of claim 1, wherein the operation of the air intake valve is based on at least one engine condition.

3. The method of claim 1, further including controlling a fuel supply system to inject fuel into the combustion chamber.

4. The method of claim 3, further including injecting at least a portion of the fuel during a portion of the compression stroke.

5. The method of claim 4, wherein injecting at least a portion of the fuel includes supplying a pilot injection at a predetermined crank angle before a main injection.

6. The method of claim 5, wherein said main injection begins during the compression stroke.

7. The method of claim 1, further including cooling the pressurized air prior to supplying the pressurized air to the air intake port.

8. The method of claim 1, wherein said supplying includes supplying a mixture of pressurized air and recirculated exhaust gas from the intake manifold to the air intake port, and wherein said operating of the air intake valve includes operating the air intake valve to open the air intake port to allow the pressurized air and exhaust gas mixture to flow between the combustion chamber and the intake manifold substantially during a majority portion of the compression stroke of the piston.

9. The method of claim 8, wherein said supplying a mixture of pressurized air and recirculated exhaust gas includes providing a quantity of exhaust gas from an exhaust gas recirculation (EGR) system.

10. The method of claim 1, further including rotating the first cam to open the intake valve and shifting rotational phase of at least one of the second cam and a camshaft including the second cam to hold the valve open during at least part of the substantial portion of the compression stroke.

11. The method of claim 1, wherein the shifting of the rotational phases varies the timing of closure of the intake valve.

12. An internal combustion engine, comprising:

an engine block defining at least one cylinder;

a head connected with said engine block, the head including an air intake port, and an exhaust port;

a piston slidable in the cylinder;

a combustion chamber being defined by said head, said piston, and said cylinder;

an air intake valve movable to open and close the air intake port;

an air supply system including at least one turbocharger fluidly connected to the air intake port;

a fuel supply system operable to inject fuel into the combustion chamber;

a first cam and second cam rotatable to operate the air intake valve;

a phase shifting device configured to shift rotational phase of one of the first and second cams; and an adjustment device adapted to adjust the position of the second cam relative to a rocker arm operably coupled with the air intake valve.

13. The engine of claim 12, wherein the engine is configured so that adjustment of the rotational phase of said one of the first cam and second cam causes said one of the first cam and second cam to keep the intake valve open during a portion of a compression stroke of the piston.

14. The engine of claim 13, wherein the engine is configured to keep the intake valve open for a portion of a second half of the compression stroke.

15. The engine of claim 12, wherein the engine is configured to close the intake valve before bottom dead center of an intake stroke of the piston.

16. The engine of claim 12, wherein rotation of the first cam opens the intake valve, and wherein the phase shifting device is configured to shift rotational phase of the second cam so that the second cam holds the valve open.

17. The engine of claim 12, wherein the at least one turbocharger includes a first turbine coupled with a first compressor, the first turbine being in fluid communication with the exhaust port, the first compressor being in fluid communication with the air intake port; and wherein the air supply system further includes a second compressor being in fluid communication with atmosphere and the first compressor.

18. The engine of claim 12, wherein the at least one turbocharger includes a first turbocharger and a second turbocharger, the first turbocharger including a first turbine coupled with a first compressor, the first turbine being in fluid communication with the exhaust port and an exhaust duct, the first compressor being in fluid communication with the air intake port, the second turbocharger including a second turbine coupled with a second compressor, the second turbine being in fluid communication with the exhaust duct of the first turbocharger and atmosphere, and the second compressor being in fluid communication with atmosphere and the first compressor.

19. The engine of claim 12, further including an exhaust gas recirculation (EGR) system operable to provide a portion of exhaust gas from the exhaust port to the air supply system.

20. A method of operating an internal combustion engine including at least one cylinder and a piston slidable in the cylinder, the method comprising:

imparting rotational movement to a first turbine and a first compressor of a first turbocharger with exhaust air flowing from an exhaust port of the cylinder;

imparting rotational movement to a second turbine and a second compressor of a second turbocharger with exhaust air flowing from an exhaust duct of the first turbocharger;

compressing air drawn from atmosphere with the second compressor;

compressing air received from the second compressor with the first compressor;

supplying pressurized air from the first compressor to an air intake port of a combustion chamber in the cylinder via an intake manifold;

operating a fuel supply system to inject fuel directly into the combustion chamber; and operating an air intake valve to open the air intake port to allow pressurized air to flow between the combustion chamber and the intake manifold, wherein the engine has a variable compression ratio;

wherein operating the air intake valve includes operating the air intake valve via at least first and second rotatable cams associated with the air intake valve; and shifting rotational phase of at least one of the first cam and a camshaft including the first cam;

wherein the engine includes an adjustment device adapted to adjust the position of the second cam relative to a rocker arm operably coupled with the air intake valve.

21. The method of claim 20, wherein fuel is injected during a combustion stroke of the piston.

22. The method of claim 20, wherein the fuel injection begins during a compression stroke of the piston.

23. The method of claim 20, wherein said operating of the air intake valve includes operating the air intake valve to open the air intake port to allow pressurized air to flow between the combustion chamber and the intake manifold during a portion of a compression stroke of the piston.

24. The method of claim 23, wherein said operating of the air intake valve includes operating the intake valve to remain open for a portion of a second half of a compression stroke of the piston.

25. The method of claim 20, wherein said operating of the air intake valve includes operating the intake valve to close the intake valve before bottom dead center of an intake stroke of the piston.

26. The method of claim 20, further including cyclically moving the intake valve, wherein said operating includes interrupting cyclical movement of the intake valve.

27. The method of claim 20, wherein the operation of the air intake valve is based on at least one engine condition.

28. The method of claim 20, wherein said first and second compressors compress a mixture of air and recirculated exhaust gas, and wherein said supplying includes supplying the compressed mixture of pressurized air and recirculated exhaust gas to said intake port via said intake manifold.

29. The method of claim 20, further including rotating the first cam to open the intake valve and shifting rotational phase of at least one of the second cam and a camshaft including the second cam to hold the valve open.

30. The method of claim 20, wherein the shifting of the rotational phases varies the timing of closure of the intake valve.

31. A method of controlling an internal combustion engine having a variable compression ratio, said engine including a block defining a cylinder, a piston slidable in said cylinder, and a head connected with said block, said piston, said cylinder, and said head defining a combustion chamber, the method comprising:

pressurizing air;

supplying said air to an intake manifold of the engine;

maintaining fluid communication between said combustion chamber and the intake manifold during a portion of an intake stroke and through a portion of a compression stroke;

wherein the maintaining includes operating an air intake valve via at least first and second rotatable cams associated with the air intake valve;

shifting rotational phase of at least one of the first cam and a camshaft including the first cam; and injecting fuel directly into the combustion chamber;

wherein the engine includes an adjustment device adapted to adjust the position of the second cam relative to a rocker arm operably coupled with the air intake valve.

32. The method of claim 31, wherein said injecting fuel includes injecting fuel directly to the combustion chamber during a portion of the combustion stroke.

33. The method of claim 31, wherein said injecting includes supplying a pilot injection at a predetermined crank angle before a main injection.

34. The method of claim 31, wherein said portion of the compression stroke is at least a majority of the compression stroke.

35. The method of claim 31, wherein said pressurizing includes a first stage of pressurization and a second stage of pressurization.

36. The method of claim 35, further including cooling air between said first stage of pressurization and said second stage of pressurization.

37. The method of claim 31, further including cooling the pressurized air.

38. The method of claim 31, wherein the pressurizing includes pressurizing a mixture of air and recirculated exhaust gas, and wherein the supplying includes supplying the pressurized air and exhaust gas mixture to the intake manifold.

39. The method of claim 38, further including cooling the pressurized air and exhaust gas mixture.

40. The method of claim 31, further including varying closing time of the intake valve so that a duration of said portion of the compression stroke differs in multiple compression strokes of the piston.

41. The method of claim 31, further including rotating the first cam to open the intake valve and shifting rotational phase of at least one of the second cam and a camshaft including the second cam to hold the valve open during at least part of the portion of the compression stroke.

42. The method of claim 31, wherein the shifting of the rotational phases varies the timing of closure of the intake valve.

43. A method of operating an internal combustion engine including at least one cylinder and a piston slidable in the cylinder, the method comprising:

supplying pressurized air from an intake manifold to an air intake port of a combustion chamber in the cylinder;

operating an air intake valve to open the air intake port to allow pressurized air to flow between the combustion chamber and the intake manifold substantially during a portion of a compression stroke of the piston, wherein the engine has a variable compression ratio;

wherein operating the air intake valve includes operating the air intake valve via at least first and second rotatable cams associated with the air intake valve;

shifting rotational phase of at least one of the first cam and a camshaft including the first cam; and injecting fuel into the combustion chamber after the intake valve is closed, wherein the injecting includes supplying a pilot injection of fuel at a crank angle before a main injection of fuel;

wherein the engine includes an adjustment device adapted to adjust the position of the second cam relative to a rocker arm operably coupled with the air intake valve.

44. The method of claim 43, wherein at least a portion of the main injection occurs during a combustion stroke of the piston.

45. The method of claim 43, further including cooling the pressurized air prior to supplying the pressurized air to the air intake port.

46. The method of claim 43, wherein said supplying includes supplying a mixture of pressurized air and recirculated exhaust gas from the intake manifold to the air intake port, and wherein said operating includes operating the air intake valve to open the air intake port to allow the pressurized air and exhaust gas mixture to flow between the combustion chamber and the intake manifold substantially during a portion of the compression stroke of the piston.

47. The method of claim 46, wherein said supplying a mixture of pressurized air and recirculated exhaust gas includes providing a quantity of exhaust gas from an exhaust gas recirculation (EGR) system.

48. The method of claim 43, further including rotating the first cam to open the intake valve and shifting rotational phase of at least one of the second cam and a camshaft including the second cam to hold the valve open during at least part of the portion of the compression stroke.

49. The method of claim 43, wherein the shifting of the rotational phases varies the timing of closure of the intake valve.

* * * * *